United States Patent
Nadeau et al.

(10) Patent No.: US 9,559,558 B2
(45) Date of Patent: Jan. 31, 2017

(54) MODULAR TRANSVERSE FLUX ELECTRICAL MACHINE ASSEMBLY

(71) Applicant: EOCYCLE TECHNOLOGIES INC., Montreal (CA)

(72) Inventors: Raphael Nadeau, Verdun (CA); Daniel Massicotte, Quebec (CA); Eric Adams, Gaspe (CA); Simon Cote, Gaspe (CA); Patrice Fortin, Gaspe (CA); Jean-Francois Bernier-Synnott, Gaspe (CA)

(73) Assignee: EOCYCLE TECHNOLOGIES INC., Montreal (CA)

( * ) Notice: Subject to any disclaimer, the term of this patent is extended or adjusted under 35 U.S.C. 154(b) by 644 days.

(21) Appl. No.: 14/033,035

(22) Filed: Sep. 20, 2013

(65) Prior Publication Data

US 2014/0084737 A1   Mar. 27, 2014

Related U.S. Application Data

(60) Provisional application No. 61/704,793, filed on Sep. 24, 2012.

(51) Int. Cl.
*H02K 3/28* (2006.01)
*H02K 16/00* (2006.01)
(Continued)

(52) U.S. Cl.
CPC ............ *H02K 3/28* (2013.01); *H02K 1/145* (2013.01); *H02K 1/185* (2013.01); *H02K 15/02* (2013.01);
(Continued)

(58) Field of Classification Search
CPC .......... H02K 3/28; H02K 3/525; H02K 1/145; H02K 1/12; H02K 1/06; H02K 16/00; H02K 16/04
(Continued)

(56) References Cited

U.S. PATENT DOCUMENTS 3,680,671 A   8/1972   Searl et al.
3,710,158 A   1/1973   Bachle et al.
(Continued)

FOREIGN PATENT DOCUMENTS

EP   1 005 136   5/2000
EP   1 063 754   6/2000
(Continued)

OTHER PUBLICATIONS

Project UpWind, Research Report Electromagnetic Optimization of Direct-drive generators; authors: Deok-je Bang, Henk Polinder ; Affiliation: Delft University of Technology (Netherlands) ; Oct. 19, 2010.
(Continued)

*Primary Examiner* — Michael Andrews
(74) *Attorney, Agent, or Firm* — Mathieu Audet

(57) ABSTRACT

A modular stator portion adapted to be used in a transverse flux electrical machine (TFEM) includes a plurality of phase modules adapted to be axially secured together with a plurality of securing members. The phase modules of at least en embodiment thereof are substantially identical and interchangeable. Each pair of axially adjacent phase modules are adapted to be angularly located in respect with each other to set a phase shift. A phase module and a kit of phase modules sized and designed to assemble a modular stator are also encompassed by the present application.

20 Claims, 36 Drawing Sheets

(51) Int. Cl.
  *H02K 15/12* (2006.01)
  *H02K 15/02* (2006.01)
  *H02K 1/18* (2006.01)
  *H02K 21/14* (2006.01)
  *H02K 1/14* (2006.01)
  *H02K 7/18* (2006.01)
  *H02K 15/06* (2006.01)

(52) U.S. Cl.
  CPC ............ *H02K 15/022* (2013.01); *H02K 15/12* (2013.01); *H02K 21/145* (2013.01); *H02K 7/1838* (2013.01); *H02K 15/066* (2013.01); *H02K 2213/12* (2013.01); *Y10T 29/49009* (2015.01); *Y10T 29/53143* (2015.01)

(58) Field of Classification Search
  USPC .............. 310/198, 254.1, 257, 112, 126, 164
  See application file for complete search history.

(56) References Cited

U.S. PATENT DOCUMENTS

| | | |
|---|---|---|
| 4,012,083 A | 3/1977 | Habermann et al. |
| 4,318,019 A | 3/1982 | Teasley et al. |
| 4,613,842 A | 9/1986 | Ichiyama et al. |
| 4,841,190 A * | 6/1989 | Matsushita ............ H02K 37/14 310/257 |
| 4,933,581 A | 6/1990 | Shramo |
| 4,970,776 A | 11/1990 | Yamamoto et al. |
| 5,176,946 A | 1/1993 | Wieloch |
| 5,854,521 A | 12/1998 | Nolle |
| 5,872,409 A | 2/1999 | Jung |
| 6,051,904 A | 4/2000 | Akemakou |
| 6,060,810 A | 5/2000 | Lee et al. |
| 6,111,329 A | 8/2000 | Graham et al. |
| 6,169,350 B1 | 1/2001 | Yang |
| 6,255,754 B1 | 7/2001 | Savage et al. |
| 6,568,065 B2 | 5/2003 | Graham et al. |
| 6,664,704 B2 | 12/2003 | Calley |
| 6,768,238 B2 | 7/2004 | Knauff et al. |
| 6,841,908 B2 | 1/2005 | Hasegawa et al. |
| 6,849,969 B2 | 2/2005 | Kang et al. |
| 6,870,294 B2 | 3/2005 | Holzheu et al. |
| 6,873,082 B2 | 3/2005 | Neet |
| 6,888,272 B2 | 5/2005 | Kastinger |
| 6,952,068 B2 | 10/2005 | Gieras et al. |
| 6,979,925 B2 | 12/2005 | Schwamm |
| 7,030,534 B2 | 4/2006 | Caamano |
| 7,084,731 B2 | 8/2006 | Kubo |
| 7,124,495 B2 | 10/2006 | Gieras et al. |
| 7,164,220 B2 | 1/2007 | Gilmour |
| 7,166,938 B2 | 1/2007 | Kang et al. |
| 7,230,361 B2 | 6/2007 | Hirzel |
| 7,305,752 B2 | 12/2007 | Graham |
| 7,327,062 B2 | 2/2008 | Kaneko |
| 7,328,500 B2 | 2/2008 | Kim et al. |
| 7,342,475 B2 | 3/2008 | Weger |
| 7,355,309 B2 | 4/2008 | Costin et al. |
| 7,358,639 B2 | 4/2008 | Caamano |
| 7,466,054 B2 | 12/2008 | Watson |
| 7,466,058 B2 | 12/2008 | Dubois et al. |
| 7,474,019 B2 | 1/2009 | Kang et al. |
| 7,561,016 B2 | 7/2009 | Kubo |
| 7,579,742 B1 | 8/2009 | Rittenhouse |
| 7,605,515 B2 | 10/2009 | Koehler |
| 7,608,968 B2 | 10/2009 | Toyoda et al. |
| 7,626,308 B2 | 12/2009 | Kang et al. |
| 7,626,309 B2 | 12/2009 | Watson |
| 7,638,919 B2 | 12/2009 | Pulnikov et al. |
| 7,669,311 B2 | 3/2010 | Iomel et al. |
| 7,675,213 B2 | 3/2010 | Tenhunen |
| 7,723,891 B2 | 5/2010 | Rittenhouse |
| 7,755,244 B2 | 7/2010 | Ley et al. |
| 7,772,741 B1 | 8/2010 | Rittenhouse |
| 7,851,965 B2 | 12/2010 | Calley et al. |
| 7,854,059 B2 | 12/2010 | Tapper |
| 7,868,508 B2 | 1/2011 | Calley et al. |
| 7,911,104 B2 | 3/2011 | Ifrim et al. |
| 7,919,897 B2 | 4/2011 | Tajima et al. |
| 7,923,886 B2 | 4/2011 | Calley et al. |
| 7,952,252 B2 | 5/2011 | Kang et al. |
| 7,969,048 B2 | 6/2011 | Ryan |
| 7,973,446 B2 | 7/2011 | Calley et al. |
| 7,994,678 B2 | 8/2011 | Calley et al. |
| 8,008,821 B2 | 8/2011 | Calley et al. |
| 8,030,814 B2 | 10/2011 | Sun et al. |
| 8,030,819 B2 | 10/2011 | Calley et al. |
| 8,033,007 B2 | 10/2011 | Jeung et al. |
| 8,053,944 B2 | 11/2011 | Calley et al. |
| 2004/0251759 A1 | 12/2004 | Hirzel |
| 2006/0082237 A1 | 4/2006 | Kerlin |
| 2006/0208602 A1* | 9/2006 | Enomoto ............... H02K 1/145 310/257 |
| 2006/0244324 A1 | 11/2006 | Graham et al. |
| 2006/0255679 A1 | 11/2006 | Dine et al. |
| 2008/0019850 A1* | 1/2008 | Tajima ..................... H02K 5/12 310/179 |
| 2008/0238232 A1 | 10/2008 | Bando et al. |
| 2008/0246362 A1 | 10/2008 | Hirzel |
| 2009/0007419 A1 | 1/2009 | Kubo |
| 2009/0026866 A1 | 1/2009 | Groening et al. |
| 2009/0108712 A1 | 4/2009 | Holtzapple et al. |
| 2010/0013343 A1 | 1/2010 | Bi |
| 2010/0038169 A1 | 2/2010 | Lee |
| 2010/0163061 A1 | 7/2010 | Creighton |
| 2010/0192357 A1 | 8/2010 | Mitsui et al. |
| 2010/0253930 A1 | 10/2010 | Ito |
| 2010/0307285 A1 | 12/2010 | Underwood |
| 2010/0308679 A1 | 12/2010 | Yamashita et al. |
| 2011/0050020 A1 | 3/2011 | Lazic et al. |
| 2011/0074231 A1 | 3/2011 | Soderberg |
| 2011/0084564 A1 | 4/2011 | Huang |
| 2011/0148224 A1 | 6/2011 | Tokoi et al. |
| 2011/0169357 A1 | 7/2011 | Gieras et al. |
| 2011/0169366 A1 | 7/2011 | Calley et al. |
| 2011/0248585 A1 | 10/2011 | Wang et al. |
| 2011/0273035 A1 | 11/2011 | Calley et al. |
| 2011/0278966 A1 | 11/2011 | Osborne et al. |
| 2011/0278978 A1 | 11/2011 | Taniguchi et al. |
| 2011/0298330 A1 | 12/2011 | Joeckel |
| 2011/0304146 A1 | 12/2011 | Surodin |
| 2012/0025637 A1 | 2/2012 | Calley et al. |
| 2012/0032537 A1 | 2/2012 | Yamashita et al. |
| 2012/0038169 A1 | 2/2012 | Azanza Ladron et al. |
| 2012/0038236 A1 | 2/2012 | Tajima et al. |
| 2012/0086302 A1 | 4/2012 | Hashimoto et al. |
| 2012/0091832 A1 | 4/2012 | Soderberg |

FOREIGN PATENT DOCUMENTS

| | | |
|---|---|---|
| JP | 55121622 | 9/1980 |
| JP | 55121623 | 9/1980 |
| JP | 57090924 | 6/1982 |
| JP | 4094515 | 3/1992 |
| JP | 4094516 | 3/1992 |
| JP | 5003127 | 1/1993 |
| JP | 5036546 | 2/1993 |
| WO | WO 88/06375 | 8/1988 |
| WO | WO 02/075895 | 9/2002 |
| WO | WO 2007/134566 | 11/2007 |
| WO | WO 2010/061200 | 6/2010 |
| WO | WO 2011/064550 | 6/2011 |
| WO | WO 2011/116776 | 9/2011 |
| WO | WO 2012/011191 | 1/2012 |

OTHER PUBLICATIONS

A New Concept for Weight Reduction of Large Direct Drive Machines; authors: G. Shresta, H. Plinder, D.J. Bang, J.A. Ferreira, A.S. McDonald ; Affiliation: Delf University of Technology (Netherlands) and WO (Great Britain) ; 2008.

(56) References Cited

OTHER PUBLICATIONS

Air-gap magnetic field design optimization for U-shaped ironless permanent magnet linear synchronous motors ; author: Peng Sun ; Affiliation: University of Beijing Huixing Zhou (People's Republic of China) ; Oct. 2008.
Design Considerations of Permanent Magnet Transverse Flux Machines; Authors: Kaiyuan Lu, Peter Omand Rasmussen, Ewen Ritchie ; Affiliation: Aalborg University (Denmark) ; Oct. 2011.
Soft Magnetic Composite with Lamellar Particles—Application to the Clawpole Transverse-Flux Machine with Hybrid Stator ; Authors: Patrick Lemieux, O. Jude Delma, Maxime R. Dubois, Roderick Guthrie ; Affiliation: McGill Metal Processing Center et Laboratoire d'Electronique, d'Electronique de Puissance et de Commande Industrielle (LEEPCI) (Canada) ; 2008.
Structural analysis and optimization of transverse flux permanent magnet machines for 5 and 10 MW direct drive wind turbines ; Authors: A. Zavvos, D. Bang, A.S. McDonald, H. Polinder, M. Mueller ; Affiliation: Delf University of Technology (Netherlands) and University of Edinburgh (Great Britain) ; Jan. 20, 2012.
Study of permanent magnet transverse flux motors with soft magnetic composite core ; Authors: Y.G. Guo and J.G. Zhu ; Affiliation: University of Technology, Sydney (Australia) ; Sep. 26-29, 2004.
The air gap and angle optimixation in the axial flux permanent Magnet motor ; Authors: C. Akuner et E. Huner.

* cited by examiner

MODULAR TRANSVERSE FLUX ELECTRICAL MACHINE ASSEMBLY

CROSS-REFERENCES

The present invention relates to, claims priority from and is a non-provisional patent application of U.S. Provisional Patent Application No.: 61/704,793, filed Sep. 24, 2012, entitled MODULAR TRANSVERSE FLUX ELECTRICAL MACHINE, these documents are incorporated herein by reference in their entirety.

BACKGROUND OF THE INVENTION

Field of the Invention

This invention relates generally to transverse flux electrical machines. The present invention more specifically relates to transverse flux alternators and motors assembly.

Description of the Related Art

Alternators and motors are used in a variety of machines and apparatuses to produce electricity from mechanical movements. They find applications for energy production and transportation, to name a few. Alternators and motors can use Transverse Flux Permanent Magnet (TFPM) technologies.

Transverse flux machines with permanent magnet excitation are known from the literature, such as the dissertation by Michael Bork, *Entwicklung and Optimierung einer fertigungsgerechten Transversalflußmaschine*. [Developing and Optimizing a Transverse Flux Machine to Meet Production Requirements], Dissertation 82, RWTH Aachen, Shaker Verlag Aachen, Germany, 1997, pages 8. ff. The circularly wound stator winding is surrounded by U-shaped soft iron cores (yokes), which are disposed in the direction of rotation at the spacing of twice the pole pitch. The open ends of these U-shaped cores are aimed at an air gap between the stator and rotor and form the poles of the stator. Facing them, permanent magnets and concentrators are disposed in such a way that the magnets and concentrators that face the poles of a stator core have the opposite polarity. To short-circuit the permanent magnets, which in the rotor rotation are intermittently located between the poles of the stator and have no ferromagnetic short circuit, short-circuit elements are disposed in the stator.

Put otherwise, transverse flux electrical machines include a circular stator and a circular rotor, which are separated by an air space called air gap, that allows a free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid coil, which is coiled in a direction that is parallel to the direction of rotation of the machine. In this type of machine, the rotor comprises a plurality of identical permanent magnet parts, which are disposed so as to create an alternated magnetic flux in the direction of the air gap. This magnetic flux goes through the air gap with a radial orientation and penetrates the soft iron cores of the stator, which directs this magnetic flux around the electrical conductors.

In the transverse flux electrical machine of the type comprising a rotor, which is made of a plurality of identical permanent magnet parts, and of magnetic flux concentrators, the permanent magnets are oriented in such a manner that their magnetization direction is parallel to the direction of rotation of the rotor. Magnetic flux concentrators are inserted between the permanent magnets and redirect the magnetic flux produced by the permanent magnets, radially towards the air gap.

The transverse flux electrical machine includes a stator, which comprises horseshoe shaped soft iron cores, which are oriented in such a manner that the magnetic flux that circulates inside these cores, is directed in a direction that is mainly perpendicular to the axis of rotation of the rotor.

The perpendicular orientation of the magnetic flux in the cores of the stator, with respect to the rotation direction, gives to transverse flux electrical machines a high ratio of mechanical torque per weight unit of the electrical machine.

It is therefore desirable to produce an electrical machine that is easy to assemble. It is also desirable to provide an electrical machine that is economical to produce. Other deficiencies will become apparent to one skilled in the art to which the invention pertains in view of the following summary and detailed description with its appended figures.

SUMMARY OF THE INVENTION

Figure 1:
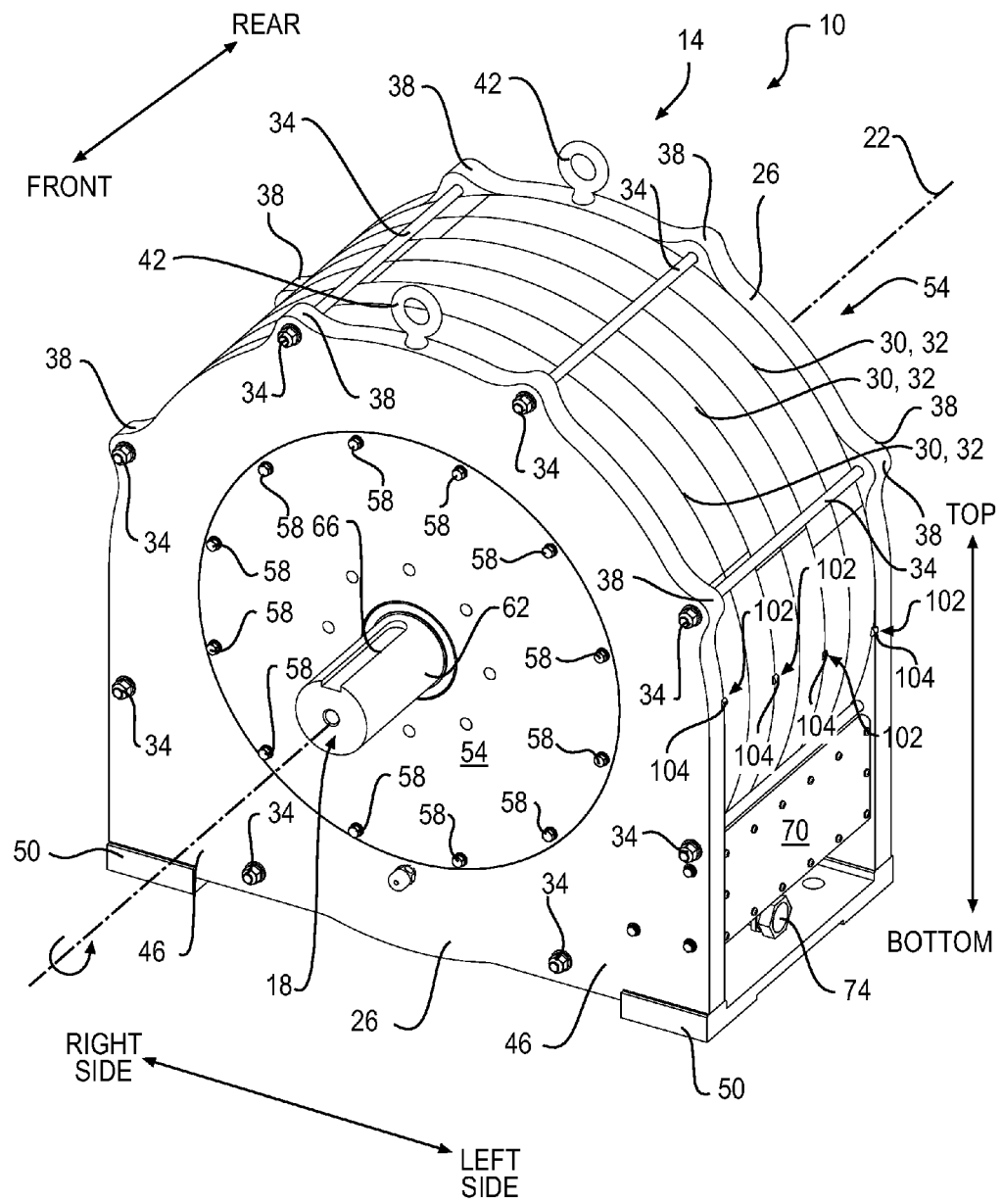
FIG. 1 is an isometric view of a TFEM in accordance with at least one embodiment of the invention.
Figure 2:
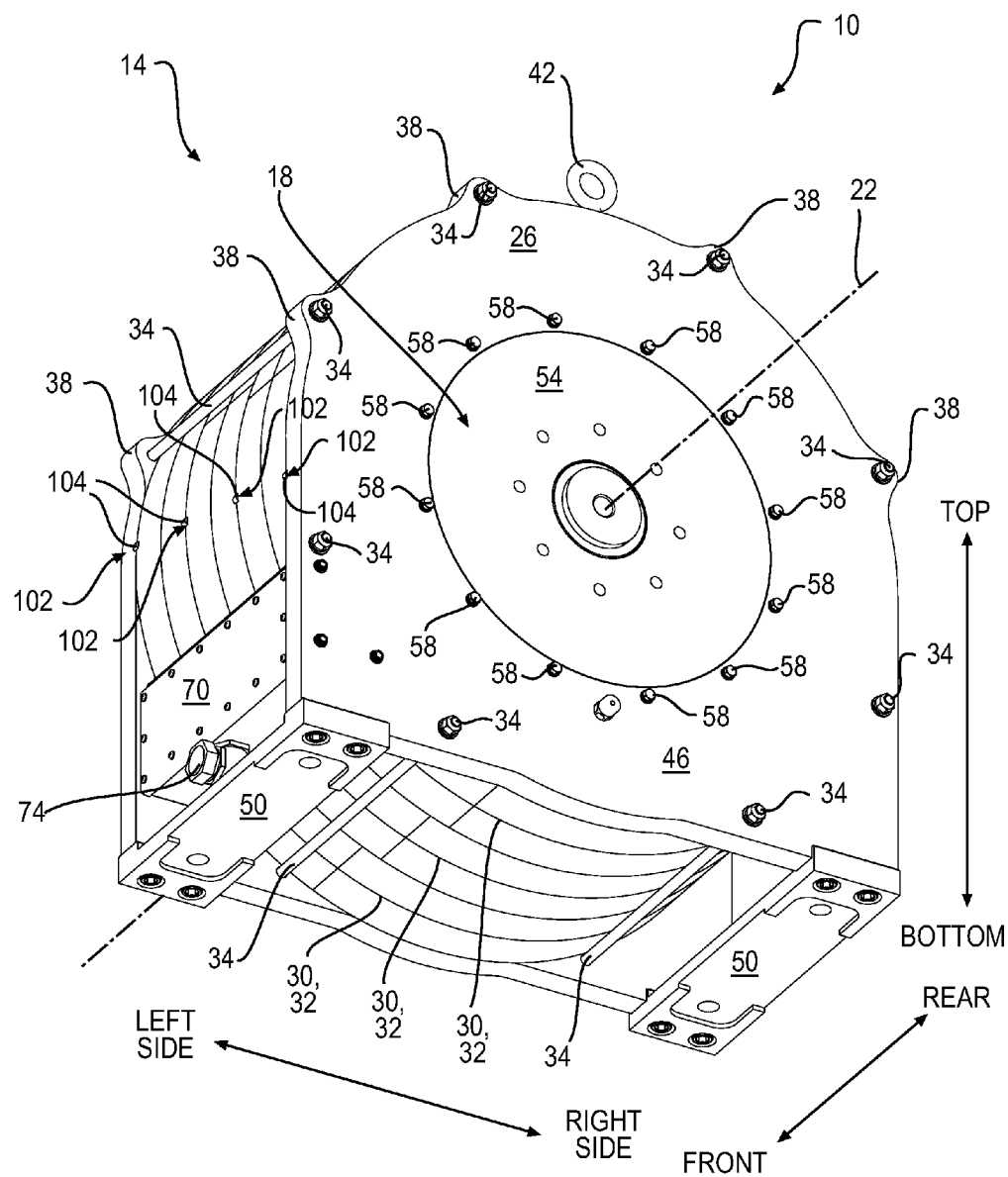
FIG. 2 is an isometric view of a TFEM in accordance with at least one embodiment of the invention.
Figure 3:
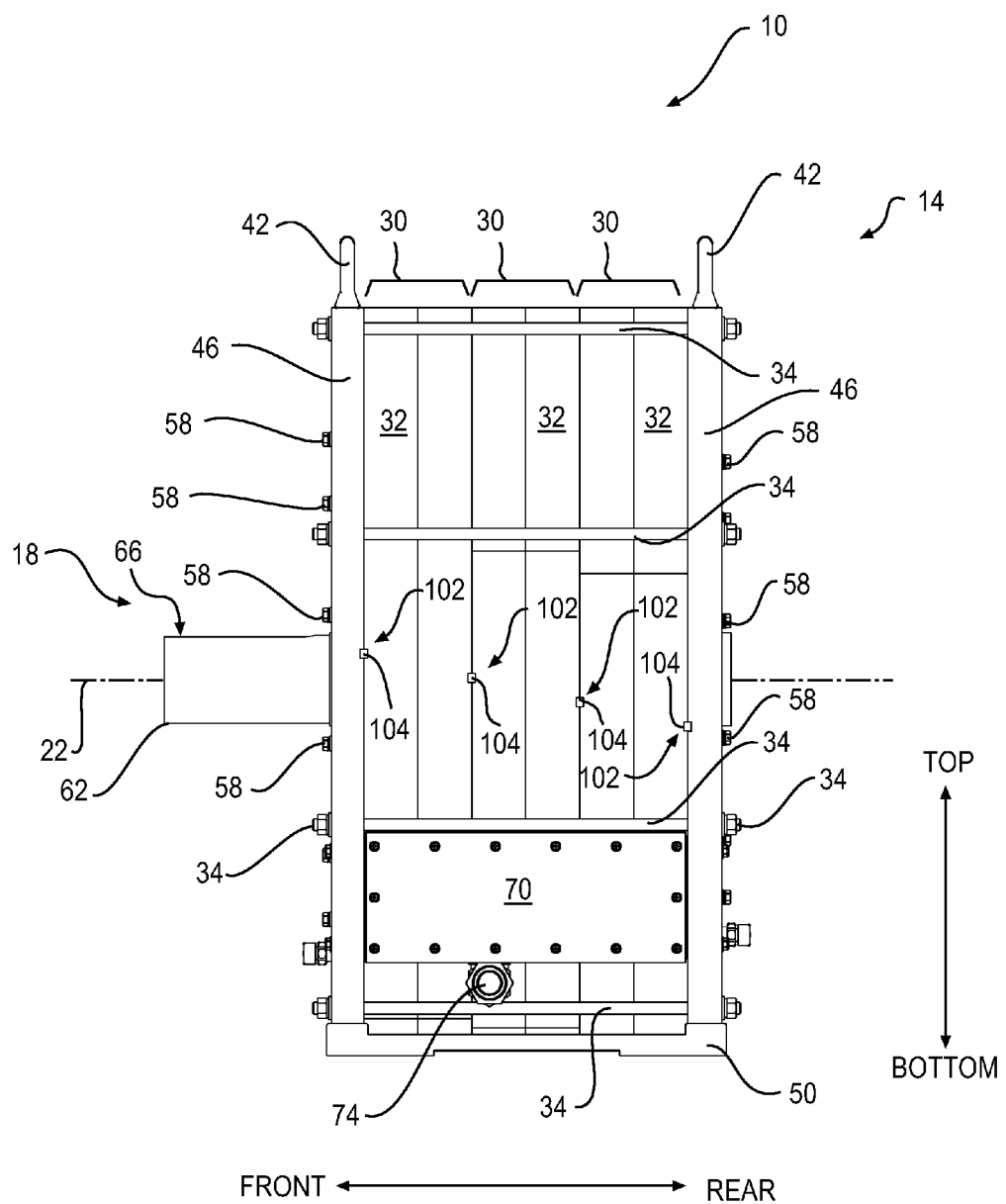
FIG. 3 is a right side elevational view of a TFEM in accordance with at least one embodiment of the invention.
Figure 4:
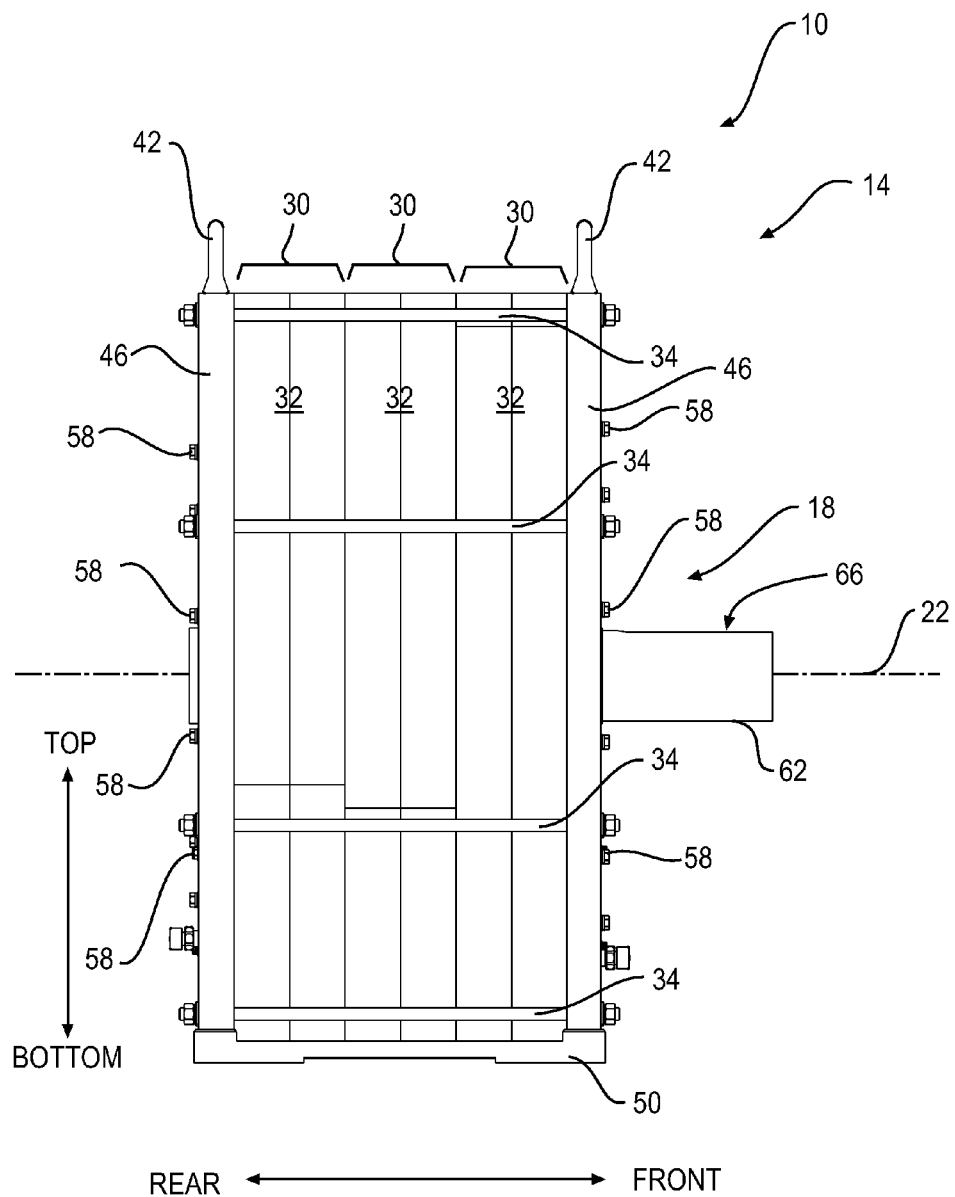
FIG. 4 is a left side elevational view of a TFEM in accordance with at least one embodiment of the invention.
Figure 5:
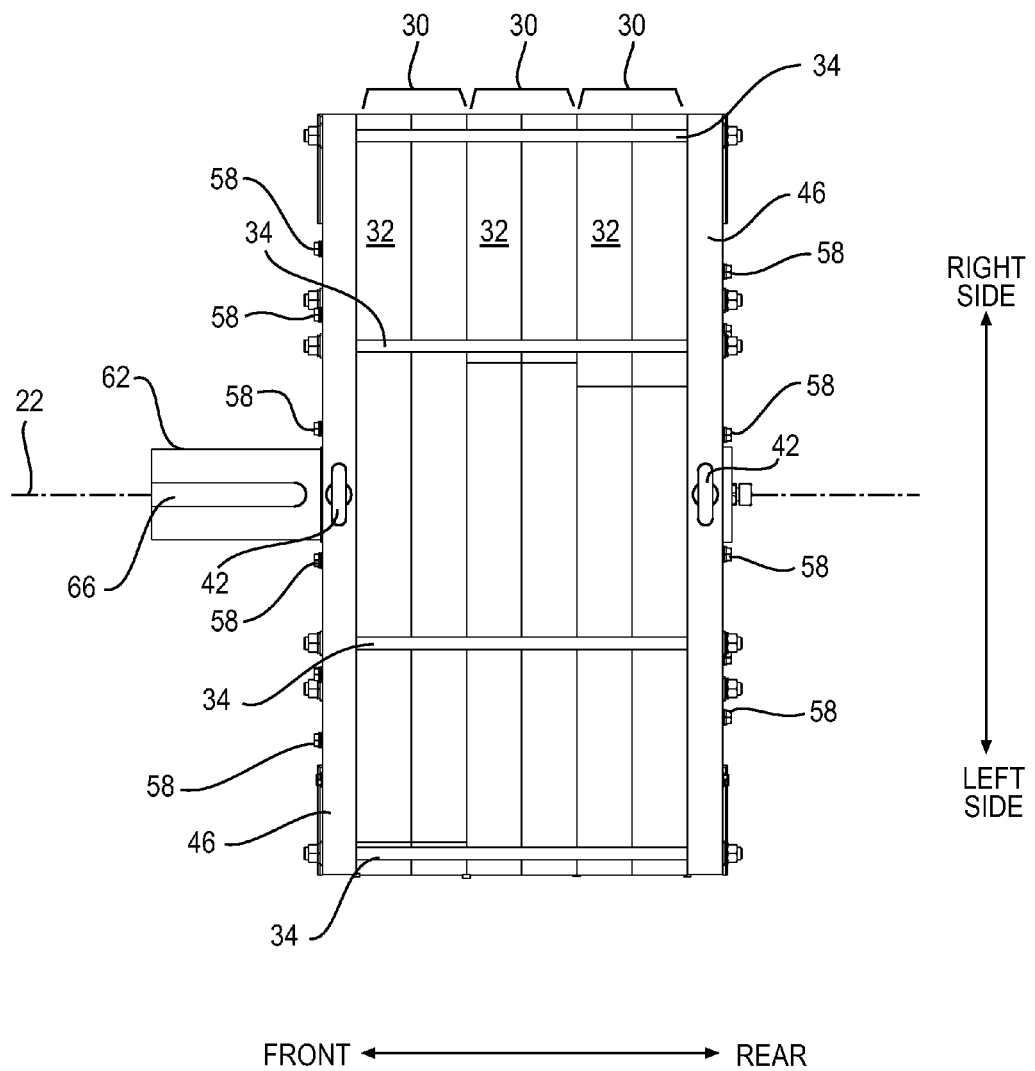
FIG. 5 is a top plan view of a TFEM in accordance with at least one embodiment of the invention.
Figure 6:
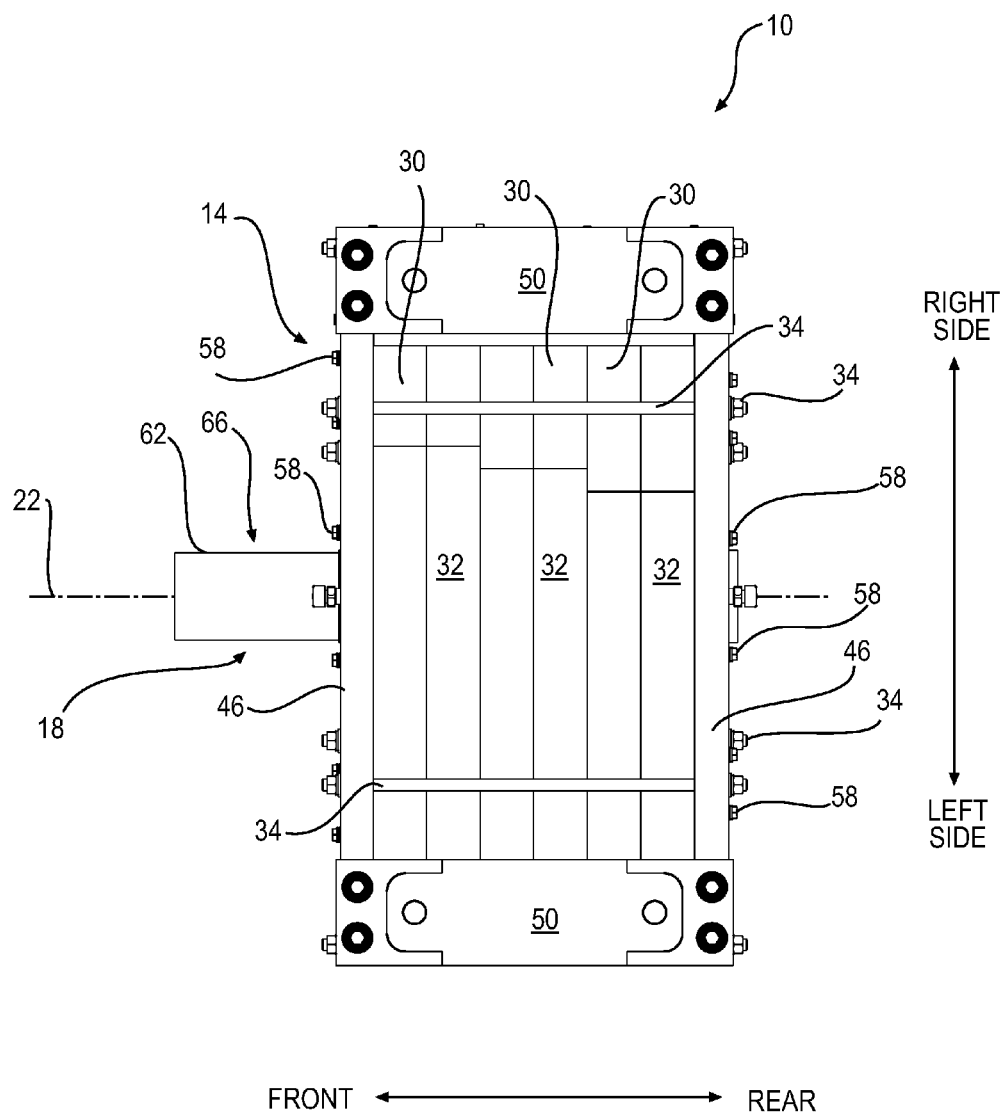
FIG. 6 is a bottom plan view of a TFEM in accordance with at least one embodiment of the invention.
Figure 7:
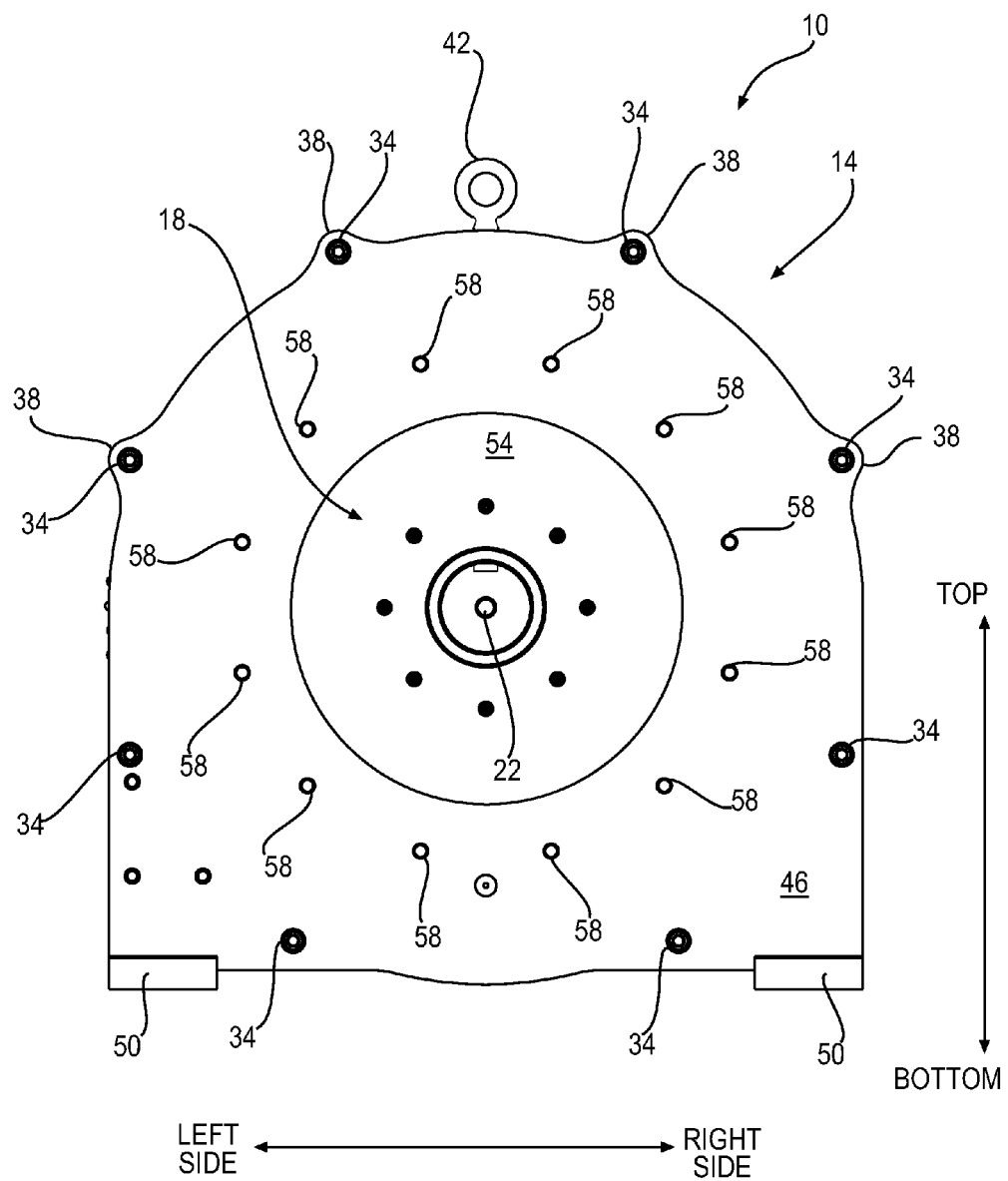
FIG. 7 is a rear elevational view of a TFEM in accordance with at least one embodiment of the invention.
Figure 8:
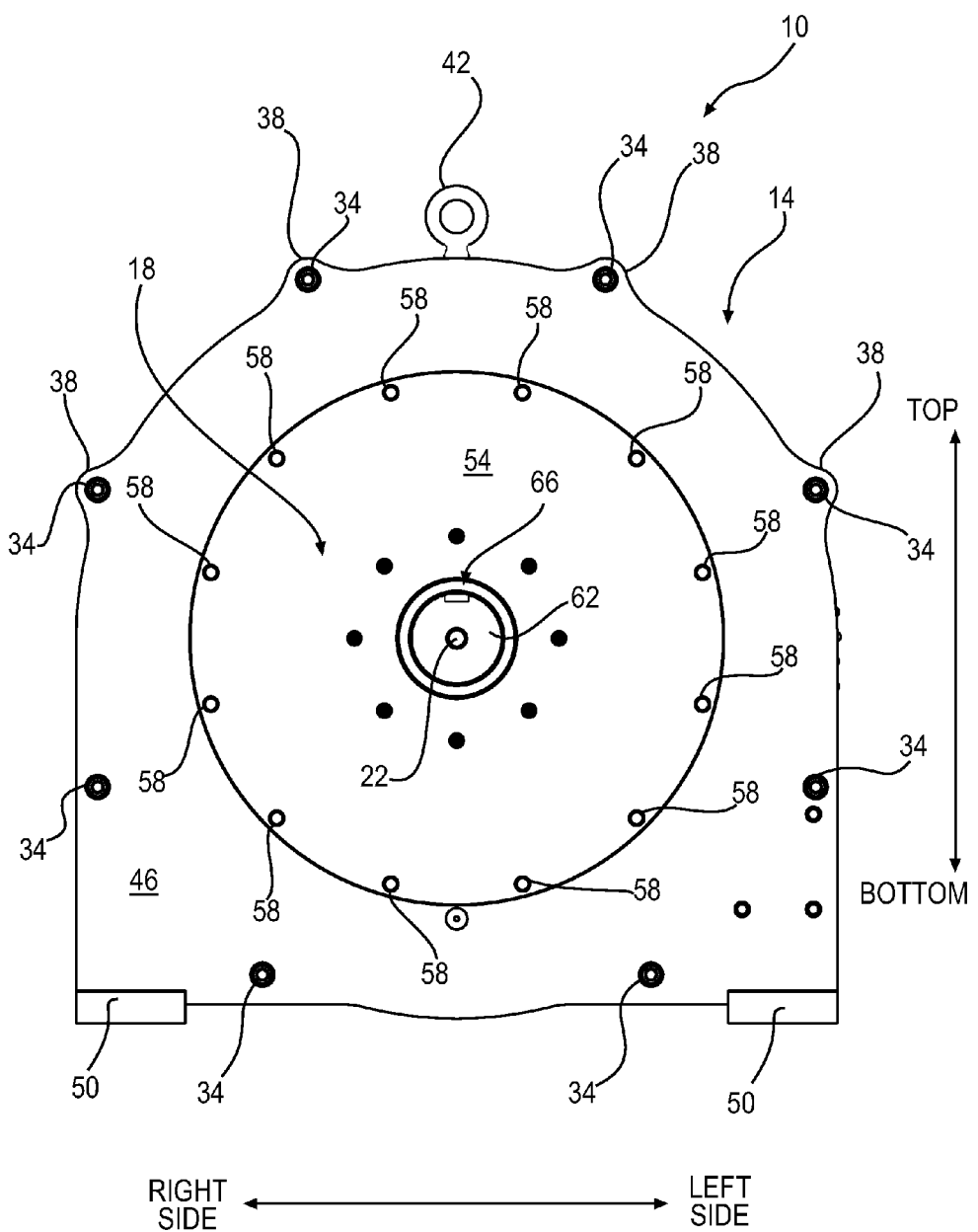
FIG. 8 is a front elevational view of a TFEM in accordance with at least one embodiment of the invention.

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Generally, an object of the present invention provides a modular Transverse Flux Electrical Machine (TFEM), which can also be more specifically appreciated as Transverse Flux Permanent Magnet (TFPM), which includes phase modules thereof.

An object of the invention is generally described as a modular electrical machine including a plurality of phase modules adapted to be axially assembled.

Generally, an object of the invention provides a TFEM including a plurality of phase modules assembled together with an intervening phase shift generally set at 120° [electrical] to provide standard symmetrical electric current overlapping over a complete 360° electrical cycle. A two-phases electrical machine would have a 90° phase shift and would use a similar logic and is also encompassed by the present invention.

One object of the invention provides at least one phase module including cooperating halves.

At least one object of the invention provides at least one phase module including a plurality of cores, and associated poles, angularly spaces apart from one another with different angular distances therebetween.

At lease one aspect of the invention provides at least one phase including at least three adjacent cores, and associated poles, angularly distanced apart with a substantially similar angular distance therebetween and each at least three adjacent cores being further angularly spaced apart from an adjacent at least three adjacent cores, and associated poles, with a different angular distance thereof.

At least one aspect of the invention provides at least two adjacent cores, and associated poles, angularly radially separated with an angle of 10.8° and angularly radially separated from adjacent cores with at least one significantly different angle.

At least one object of the invention provides a set of poles, and intervening angular distance therebetween, that is repeated at least two times in a phase to locate the poles in the phase module.

At least one object of the invention provides a modular TFEM including a plurality of phase modules axially secured together by opposed support portions.

At least one aspect of the invention provides a phase module including a plurality of identical angular portions thereof.

At least one aspect of the invention provides a plurality of angular portions having intervening locating mechanism thereof adapted to locate and secure adjacent angular portions together.

At least one aspect of the invention provides an angular portion including a wire opening thereof adapted to receive therein coil wires extending outside the phase module.

At least one object of the invention provides a TFEM including a stator skewing angularly locating cores therein in respect with the rotation axis of the TFEM.

At least one object of the invention provides a plurality of phase modules including a cooperating positioning mechanism thereof adapted to mechanically angularly locate adjacent phase modules axially assembled together.

At least one aspect of the invention provides at least one phase module including a plurality of core-receiving spaces thereof.

At least one aspect of the invention provides at least one phase module including a housing including a circumferential cavity adapted to receive therein a cooperating portion of the cores to further mechanically radially locate and secure the cores to the phase module housing.

At least one object of the invention provides a phase modules including a plurality of angular portions adapted to be sequentially assembled together to allow inserting a coil therein before all the angular portions are assembled together.

At least one object of the invention provides a phase module including a plurality of angular portions configured to allow insertion of a coil therein when the assembled angular portions are angularly covering less than 200°.

At least one object of the invention provides a TFEM stator including resin therein for securing the coil and the cores inside the angular portions and also to maintain them in their respective locations when the internal portion of the phase module is machined, bored or honed.

At least one object of the invention provides a TFEM stator including injected resin therein for securing the angular portions together with the coil.

A rotatable transverse flux electrical machine (TFEM) comprising a modular stator including a plurality of axially assembled phase modules, each phase module comprising a plurality of cores secured inside respective phase modules; and a coil operatively disposed in respect with the cores inside each phase modules, and a rotor rotatably axially located in relation with the modular stator portion.

A modular stator adapted to be used in a rotatable transverse flux electrical machine (TFEM), the modular stator comprising a plurality of axially assembled self-containing phase modules, each phase module comprising a plurality of cores secured inside respective phase modules; and a coil operatively disposed in respect with the cores inside each phase modules, wherein the modular stator is configured to operatively receive therein a rotor axially located in relation with the modular stator portion.

A kit for assembling a modular stator in a rotatable transverse flux electrical machine (TFEM), the kit comprising a plurality of phase modules sized and designed to be axially assembled together, each phase module comprising a plurality of cores operatively disposed inside each phase module; and a coil operatively disposed in respect with the cores inside each phase modules, the plurality of phase modules, once assembled, being adapted to receive therein a rotor rotatably and axially located in respect with the assembled phase modules.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Our work is now described with reference to the Figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The embodiments illustrated below depict a TFEM 10 with thirty-two (32) pairs of poles and a 510 mm diameter at the air gap and a 100 mm length of the magnets. The configuration of the TFEM 10, an external rotor instead of an internal rotor, the number of phases can change in accordance with the desired power output, torque and rotational speed without departing from the scope of the present invention.

A TFEM 10 is illustrated in FIG. 1 through FIG. 8. The TFEM 10 includes a stator portion 14 and a rotor portion 18. The stator portion 14 is adapted to remain fixed while the rotor portion 18 is located within the stator portion 14 and is adapted to rotate in respect with the stator portion 14 about rotation axis 22. The TFEM of the illustrated embodiments has a modular construction. Two axial side members 26 are secured together to assemble three electrical phases 30 together, each being provided by a phase module 32. Each phase module 32 is adapted to individually provide an electrical phase 30 of alternating current. The present embodiment illustrates three phases 30 axially coupled together to provide tri-phased current when the TFEM 10 is rotatably actuated. The pair of axial side members 26 interconnects and axially secures together the three phases 30. Proper tension is applied to each of the plurality of axial securing members 34 to ensure the phase modules 32 remain fixedly secured together. In the present embodiment, each axial side member 26 is provided with a series of extending axial securing member receiving portions 38 adapted to receive the axial securing members 34 therein while the axial securing members 34 extends axially outside the phase modules 32. The axial securing members 34 could alternatively pass through the phase modules 32, provided with axial openings therein, in another unillustrated embodiment.

Still referring to FIG. 1 through FIG. 8, the axial side members 26 can be made of steel or other suitable material providing sufficient mechanical strength for the required purpose. Each axial side members 26 is optionally provided with a lifting link 42 sized and designed to receive therein, for example, a crane hook (not illustrated) to lift and move the TFEM 10. The axial side members 26 are further equipped with a support portion 46 adapted to secured thereto a pair of feet 50 configured to interconnect both axial side members 26 together and to further facilitate securing the TFEM 10 to a base chassis (not illustrated). For instance, the base chassis can be a nacelle when the TFEM 10 is installed in a windmill or alternatively any other chassis provided by the equipment the TFEM 10 is operatively connected to.

Each axial side member 26 is configured to receive and secure thereto an axial rotor support member 54. The axial rotor support member 54 is recessed in a circular cavity 56 (visible in FIG. 9) defined in its associated axial side member 26 to concentrically locate the rotor portion 18 in respect with the stator portion 14. The axial rotor support member 54 is further removably secured to its associated axial side member 26 with a plurality of fasteners 58. The actual configuration of the embodiment illustrated in FIG. 9 allows removal of the rotor portion 18 in one axial direction 60 when both axial rotor support members 54 are unsecured from their respective axial side member 26 because the circular cavities 56 are both located on the same side of their respective axial side member 26. This allows for easy maintenance of the TFEM 10 once installed in its operating configuration with its external mechanism.

As it is also possible to appreciate from the embodiment illustrated in FIGS. 1 through 8, the rotor portion 18 extends through the axial rotor support members 54 and rotatably engages both axial rotor support member 54. A solid rotor drive member 62 further extends from one axial rotor support members 54. The solid drive member 62 could alternatively be a hollowed drive member in another unillustrated embodiment. The drive member 62 is adapted to transmit rotatable motive power from an external mechanism (not illustrated) to the TFEM 10 and includes a drive securing mechanism 66 adapted to rotatably couple the drive member 62 of the TFEM 10 to a corresponding rotatable drive element from the external mechanism (not illustrated). The external mechanism (not illustrated) could, for example, be a windmill rotatable hub (not illustrated) to which the rotor blades (not illustrated) are secured to transmit rotational motive power to the TFEM 10. The external mechanism expressed above is a non-limitative example and other external mechanisms adapted to transmit rotational motive power to the TFEM 10 are considered to remain within the scope of the present application.

The TFEM 10 is further equipped with a protective plate 70 adapted to store and protect electrical connectors and electrical wires that extends from the TFEM 10 through an electrical outlet 74.

Figure 9:
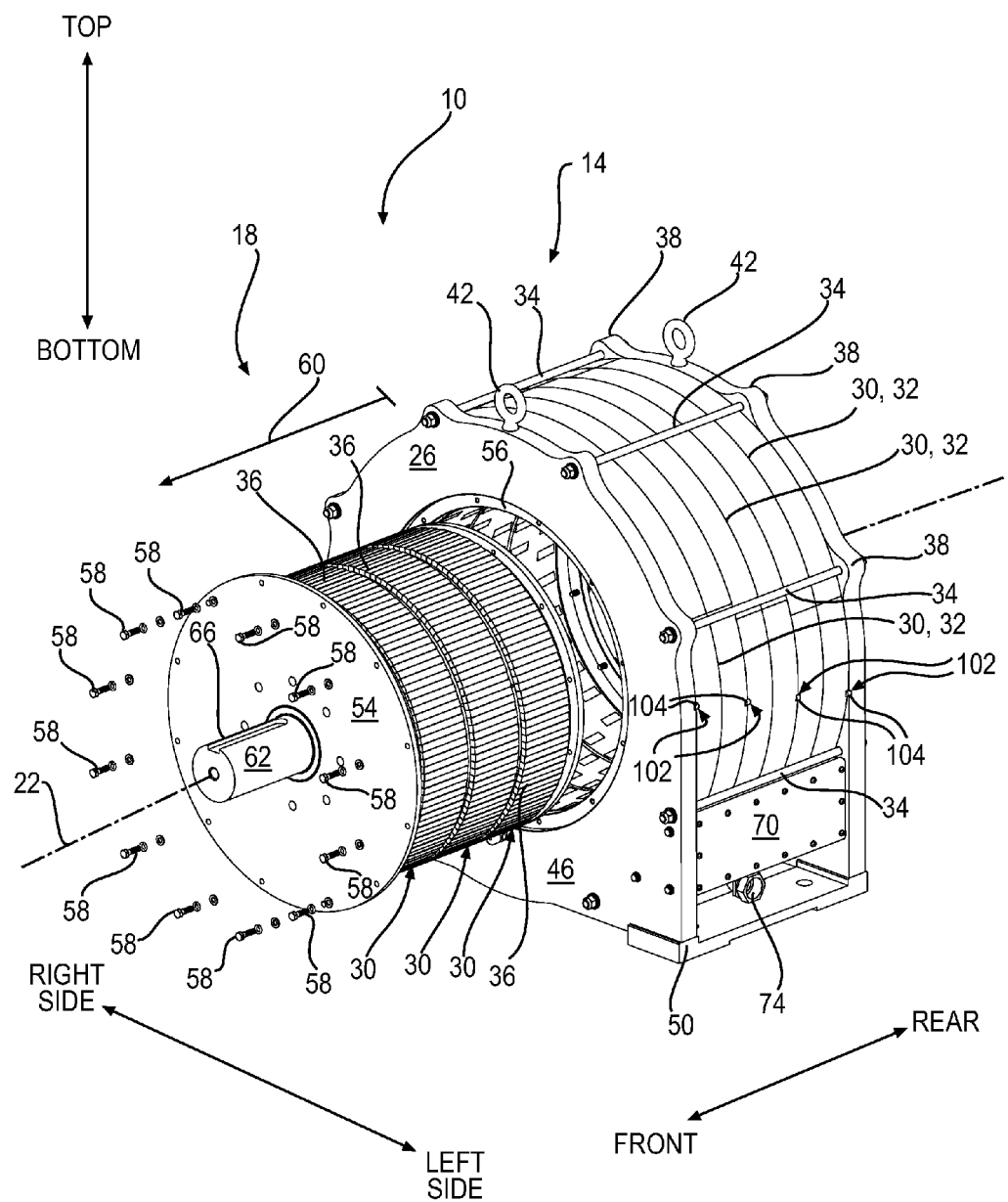
FIG. 9 is an isometric semi-exploded view of a TFEM illustrating a stator portion and a rotor portion in accordance with at least one embodiment of the invention.

Turning now to FIG. 9 illustrating a semi-exploded TFEM 10 where a skilled reader can appreciate the depicted rotor portion 18 is axially extracted 60 from the stator portion 14. The rotor portion 18 is axially extracted 60 from the stator portion 14 by removing the plurality of fasteners 58 and unsecuring the axial rotor support members 54 from their respective associated axial side member 26. It can be appreciated that the rotor portion 18 of the exemplary embodiment has three distinct modular phases 36, each providing an electrical phase 30, adapted to axially align and operatively cooperate with the three phase modules 32 of the exemplified stator portion 14. The rotor portion 18 includes a plurality of magnets 94 and concentrators 98 that are disposed parallel with the rotation axis 22. An alternate unillustrated embodiment uses skewed magnets 94 and concentrators 98 that are disposed non-parallel (at an angle) with the rotation axis 22.

Figure 10:
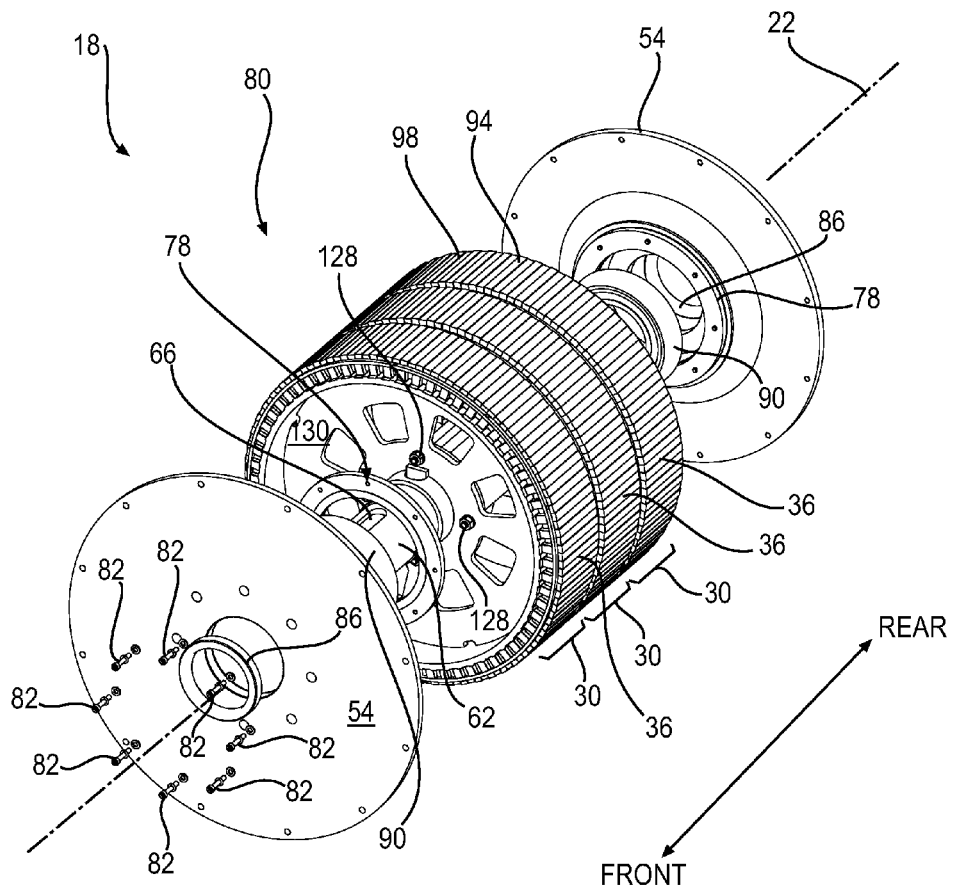
FIG. 10 is an isometric semi-exploded view of a portion of a TFEM illustrating a rotor portion in accordance with at least one embodiment of the invention.

FIG. 10 illustrates a further exploded view of the rotor portion 18. As indicated above, the rotor portion 18 is adapted to rotate in respect with the stator portion 14. The speed of rotation can differ depending of the intended purpose. Power remains function of the torque and the rotation speed of the rotor portion 18 therefore the TFEM is going to produce more power if the TFEM rotates rapidly as long as its operating temperature remains in the operating range of its different parts to prevent any deterioration (e.g. magnet demagnetization or insulating vanish deterioration, to name a few). The axial rotor support members 54 are adapted to be unsecured from the bearing holder 78 by removing the plurality of fasteners 82. A sequence of assembled seal 86, bearing 90 and bearing holder 78 is used on the front side of the rotor portion 18 while the same type of assembly is used on the opposite axial side of the rotor portion 18 to rotatably secure the rotor 80 to the axial rotor support members 54. FIG. 10 also illustrates that each phase module 36 of the rotor 80 uses a sequence of alternating permanent magnets 94 and concentrators 98. Strong permanent magnets 94 can be made of Nb—Fe—B as offered by Hitachi Metals Ltd and NEOMAX Co. Ltd. Alternatively, suitable magnets can be obtained by Magnequench Inc. and part of this technology can be appreciated in patents U.S. Pat. Nos. 5,411,608, 5,645,651, 6,183,572, 6,478,890, 6,979,409. and 7,144,463.

Figure 11:
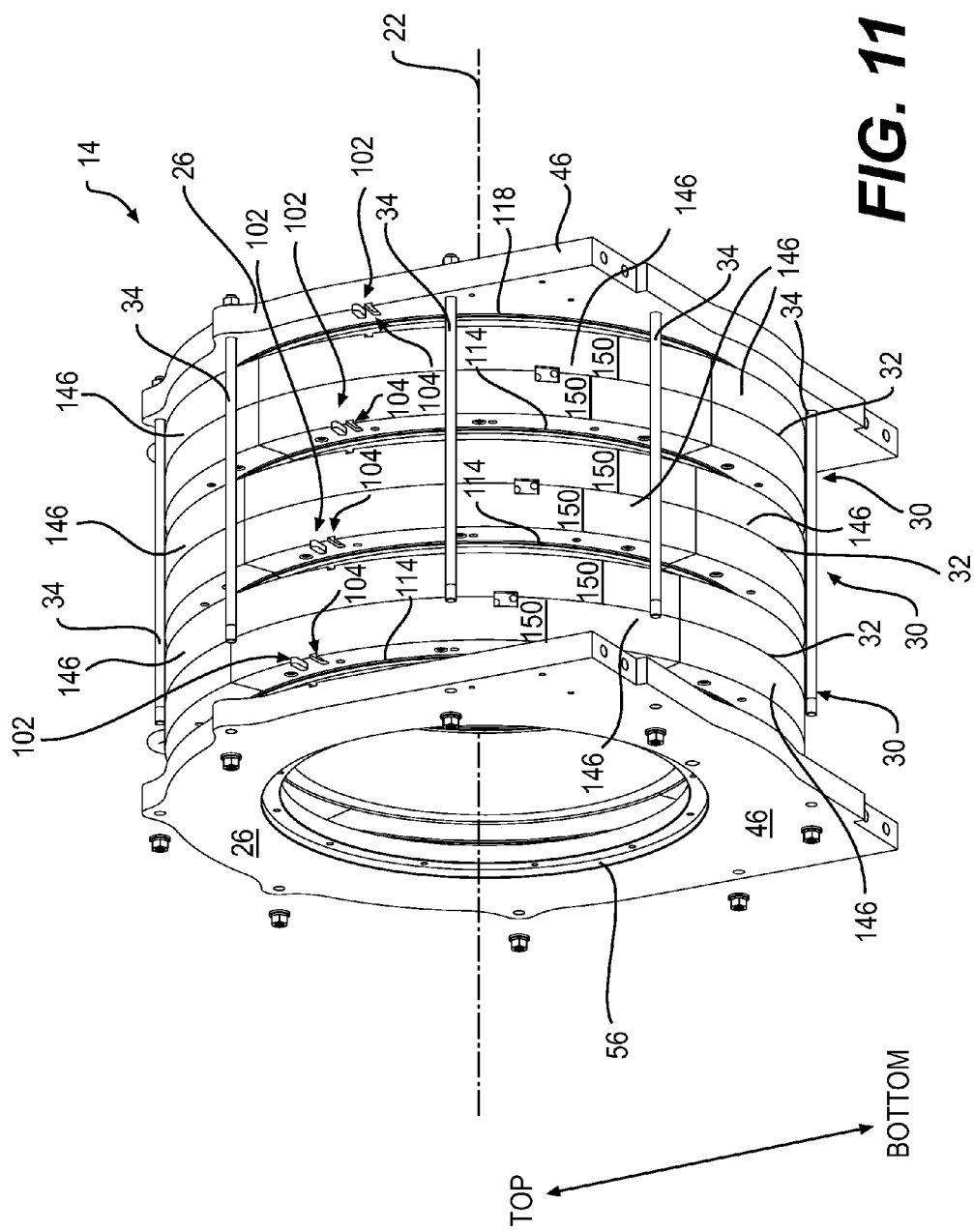
FIG. 11 is an isometric semi-exploded view of a TFEM illustrating multiple phase modules of a stator portion in accordance with at least one embodiment of the invention.

A semi-exploded stator portion 14 is illustrated in FIG. 11. The axial side members 26 are exploded from the illustrative three (3) phase modules 32. Each phase module 32 is going to be discussed in more details below. However, a positioning mechanism 102 is provided to polarly locate each phase module 32 in respect with its adjacent phase module 32 so that proper phase shift is maintained. Generally, the phase shift is set at 120° electrical to provide standard symmetrical electric current overlapping over a complete 360° electrical cycle. The 120° phase shift allows to, in theory, eliminate harmonics that are not multiples of three (3). The 120° phase shift illustrated herein is a preferred embodiment and is not intended to limit the angular phase shift of the present invention.

The illustrative embodiment of FIG. 11 includes three (3) phase modules 32. Another possible embodiment includes a multiple of three (3) phases modules 32 mechanically secured together, like the three (3) phase modules of FIG. 11, and electrically connected by phase 30 to increase the capacity of the TFEM 10 by simply increasing the axial length of the TFEM 10. Thus, a nine (9) phase modules 32 would be coupled three-by-three for a three-phased 30 TFEM 10. Another embodiment is a one-phase 30 TFEM 10 including only one phase module 32. One other embodiment could be a two-phased 30 TFEM 10 electrically coupled together in a one-phase 30 configuration and with a phase shift of 90° in a two-phase 30 configuration.

Figure 12:
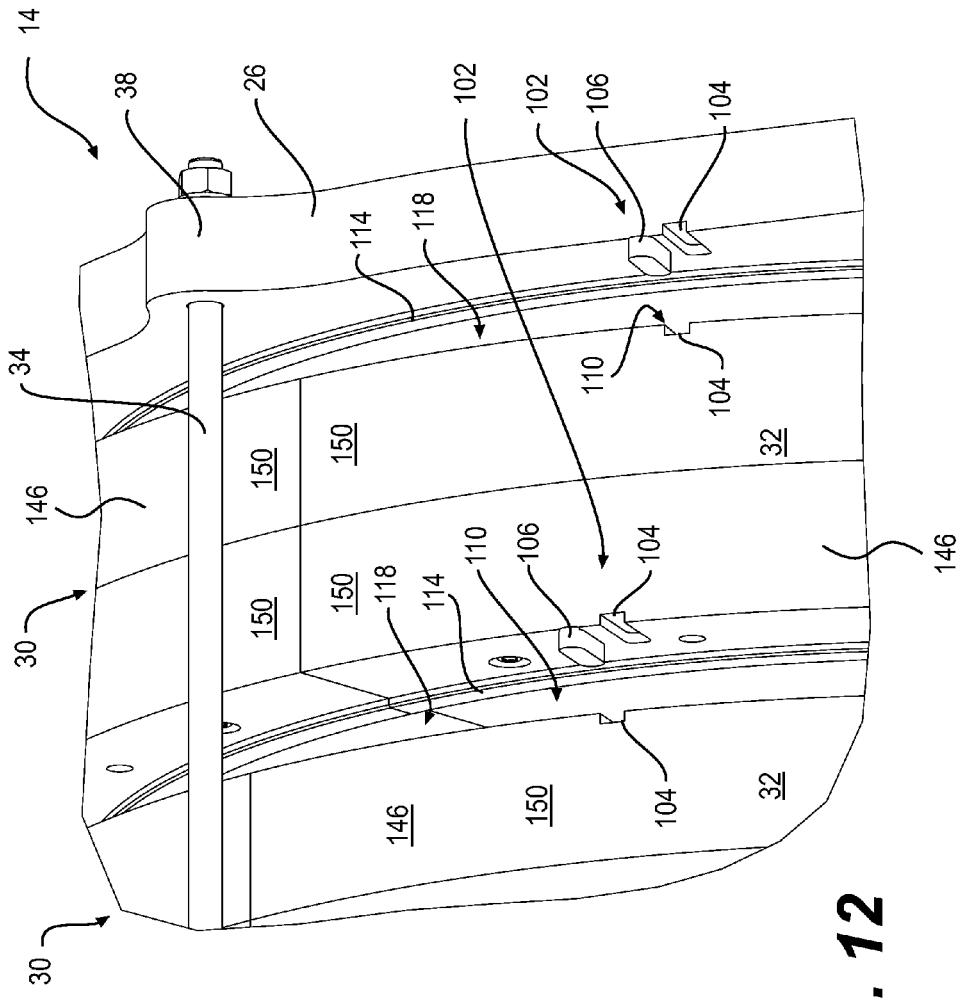
FIG. 12 is a magnified section of an isometric semi-exploded view of a TFEM in accordance with at least one embodiment of the invention.

As best seen from FIG. 12, each positioning mechanism 102 is embodied as a protruding portion 106 and corresponding cavity 110 sized and designed to mate together to polarly locate two adjacent phase modules 32 together. Additionally, each phase module 32 further includes a circular ridge 114 on one axial side and corresponding circular groove 118 on the opposite axis side. Engagement of the circular ridge 114 and circular groove 118 ensures concentric positioning of adjacent phase modules 32 along the rotation axis 22 of the TFEM 10. Other shapes, designs and/or mechanical elements suitable to locate the phase modules 32 and the axial side members 26 together could be used without departing from the scope of the present application. Additionally, the recessed portion 104 is further defined in the phase modules 32 and the axial side members 26 to facilitate separation of adjacent assembled phase modules 30 and cooperating axial side members 26 by inserting a tool therein and prying to separate the two adjacent phase modules 32.

Figure 13:
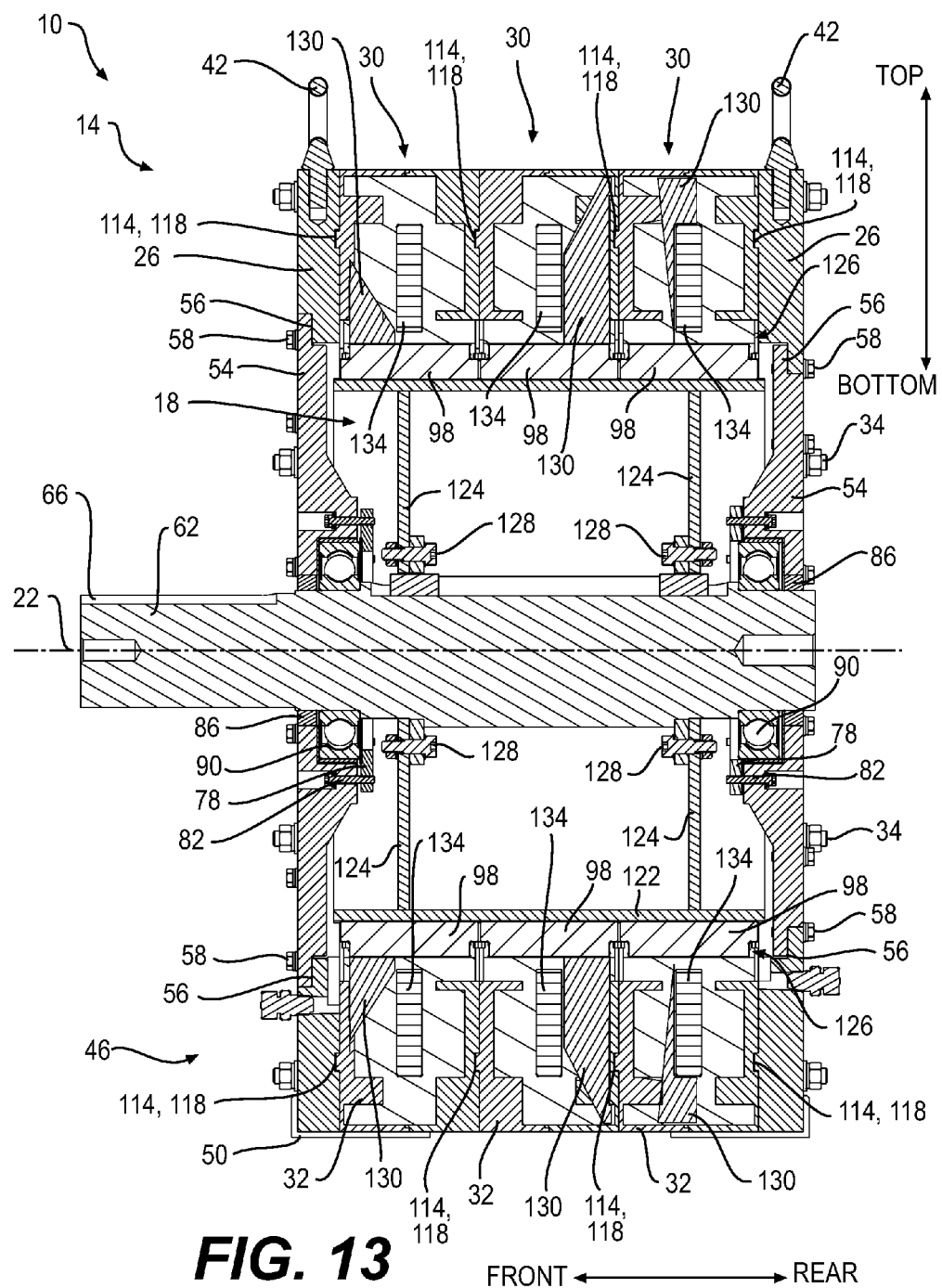
FIG. 13 is a section view of a TFEM illustrating multiple phase modules in accordance with at least one embodiment of the invention.

A section view of the TFEM 10 is illustrated in FIG. 13. The rotor portion 18 includes a cylindrical frame 122 preferably removably secured to the rotatable drive member 62 with a series of fasteners 128 via two plates 124 radially extending from the drive member 62. As explained above, the cylindrical frame 122 is sized and designed to accommodate three electrical phases 30, each provided by a phase module 36 including its alternate series of magnets 94 and concentrators 98 secured thereon. The circular stator portion 14 and the circular rotor portion 18 are separated by an air space called "air gap" 126 that allows an interference-free rotation of the rotor portion 18 with respect to the stator portion 14. Generally, the smallest is the air gap 126 the most performance the TFEM is going to provide. The air gap 126 is however limited to avoid any mechanical interference between the stator portion 14 and the rotor portion 18 and is also going to be influenced by manufacturing and assembly tolerances in addition to thermic expansion of the parts when the TFEM 10 is actuated. The stator portion 14 comprises soft iron cores (cores) 130 that direct the magnetic flux in a direction that is mainly perpendicular to the direction of rotation of the rotor portion 18. The stator portion 14 of TFEM 10 also comprises in each phase module 32 electrical conductors defining a toroid coil 134 that is coiled in a direction that is parallel to the direction of rotation of the TFEM 10. In this embodiment, the rotor portion 18 comprises a plurality of identical permanent magnets 94, which are disposed so as to create an alternated magnetic flux in the direction of the air gap 126. This magnetic flux goes through the air gap 126 with a radial orientation and penetrates the soft iron cores 130 of the stator portion 14, which directs this magnetic flux around the toroid coil 134.

In the TFEM 10 of the type comprising a rotor portion 18 including a plurality of identical permanent magnets 94 and of magnetic flux concentrators 98, the permanent magnets 94 are oriented in such a manner that their magnetization direction is parallel to the direction of rotation of the rotor portion 18, along rotation axis 22. Magnetic flux concentrators 98 are disposed between the permanent magnets 94 and redirect the magnetic flux produced by the permanent magnets 94 radially towards the air gap 126. In contrast, the stator portion 14 comprises "horseshoe-shaped" soft iron cores 130, which are oriented in such a manner that the magnetic flux that circulates inside these cores 130 is directed in a direction that is mainly perpendicular to the direction of rotation of the rotor portion 18. The perpendicular orientation of the magnetic flux in the cores 130 of the stator portion 14, with respect to the rotation direction, gives to TFEM a high ratio of mechanical torque per weight unit of the electrical machine.

Figure 14:
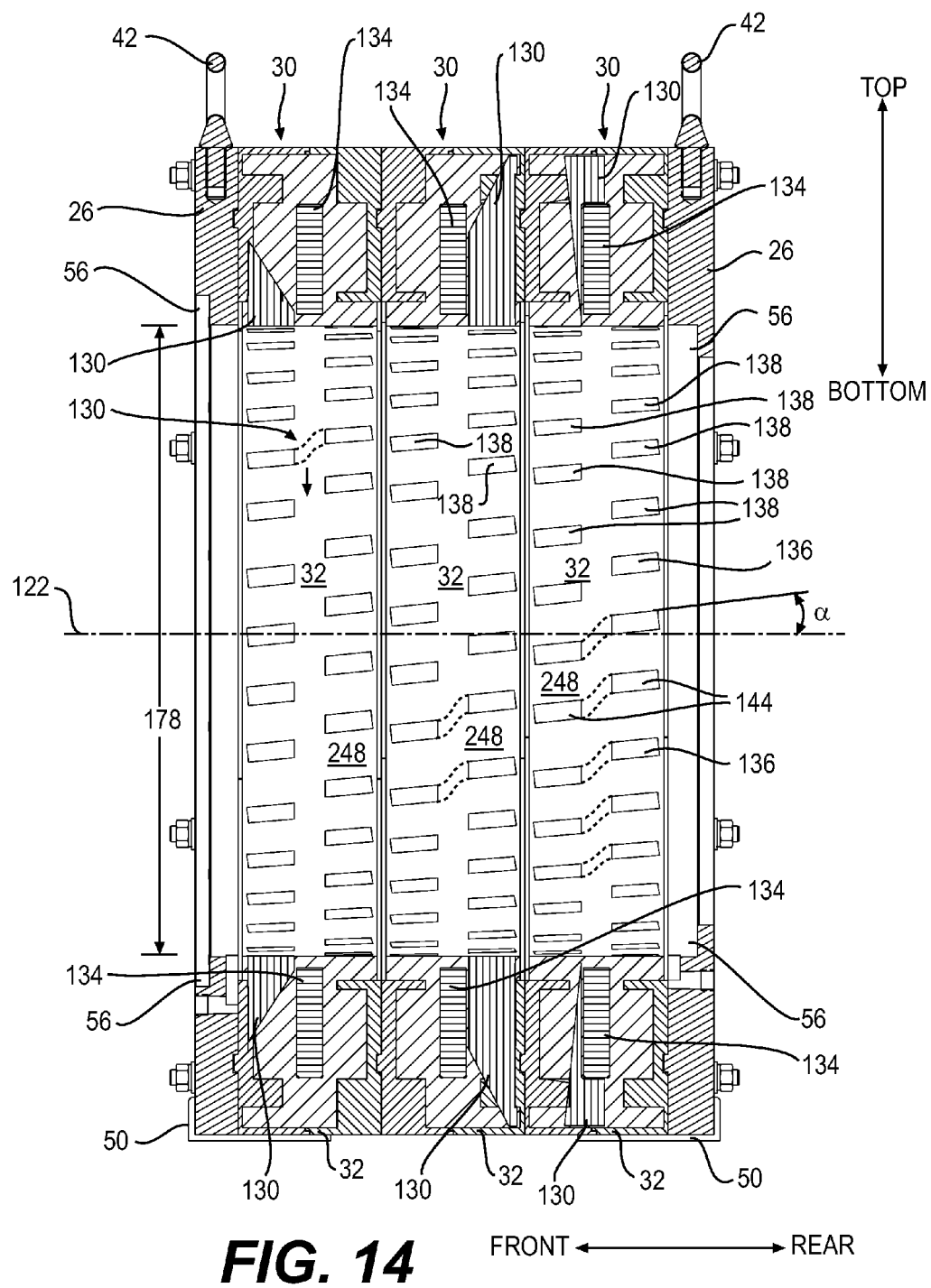
FIG. 14 is a section view of a TFEM illustrating cores pairs in a stator portion in accordance with at least one embodiment of the invention.
Figure 15:
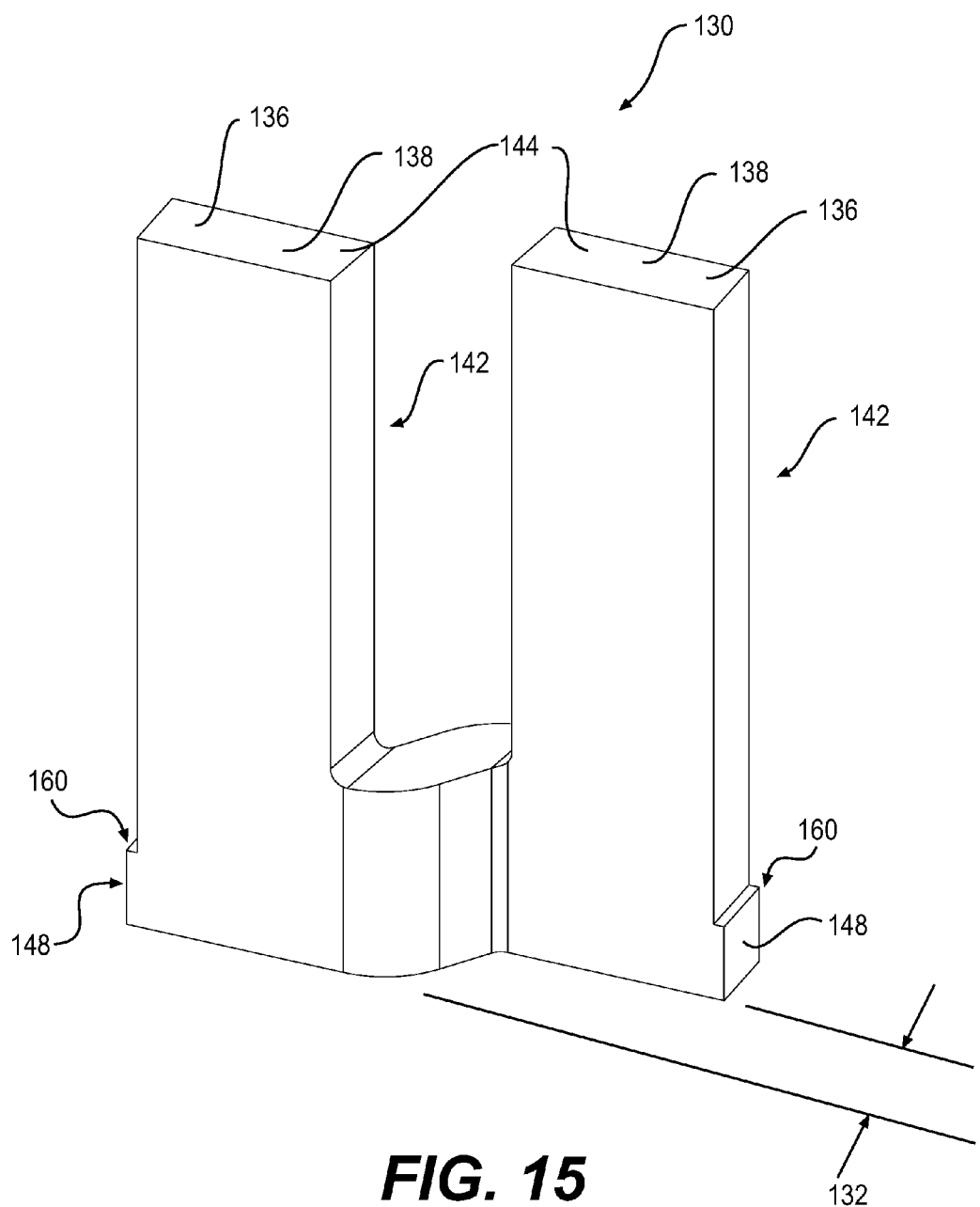
FIG. 15 an isometric view of a core in accordance with at least one embodiment of the invention.

The rotor portion 18 has been removed in FIG. 14 illustrating an encumbrance-free section view of the stator portion 14. One can appreciate a plurality of pole faces 138 extending from each core's 130 legs 142 (as best seen in FIG. 15). The pole faces 138 are disposed at an angle α from the rotation axis 22 of the TFEM 10. The angle α of the pole faces 138 is called stator skew and is one of a plurality of elements that can be acted upon to reduce or cancel the ripple torque and the cogging torque. The stator skew allows for progressive electromagnetic interaction between the cores 130 and the magnets 94 and the concentrators 98.

Focusing on the stator skew element, in reference with FIG. 14 through FIG. 18, a plurality of cores 130 are disposed in each phase module 32 of the stator portion 14. Yet another element to consider is the number of pairs of poles n. The number of pairs of poles n is equal to the number of cores 130 given that there are two poles 138 per core 130. The number of magnets 94 is equal to the number of concentrators 98 and their number is twice the number of pairs of poles n and consequently also twice the number of cores 130. The number of pairs of poles n is preferably thirty-two (32) as exemplified in the present application.

Therefore, each core 130 includes a pair of poles 144 extending from respective core's legs 142 (not visible in FIG. 14 but illustrated in FIG. 15). Each core 130 ends with two poles 136 having respective pole faces 138 thereof that can be seen inside the stator module 14 illustrated in FIG. 14. Each pole 136 of a pair of poles 144 is offset 132 to locate each pole 136 from a pair of poles 144 at a distance thereof that is generally equivalent to a distance of two adjacent concentrators 98 on the rotor portion 18 (commonly referred to as "pole pitch"). The core 130 of the illustrated embodiment includes a pair of opposed locating portions 148 adapted to locate the core 130 in the phase module 32. The locating portions 148 are embodied in the illustrative core 130 in FIG. 15 as protrusions 160 extending from the opposed sides of the core 130. The skewed pole faces 138 of an embodiment are a projection toward the rotation axis 22 of the angled core's legs 142. Each pair of pole faces 138 can be skewed, or angled, to more or less progressively engage the electromagnetism of the magnets 94 and the concentrators 98 on the rotor portion 18, on the other side of the air gap 126, when the rotor portion 18 is operatively assembled with the stator portion 14. The angle α of the pole faces 138 of the illustrated embodiment is provided by the angle of the core's legs 142 that is dictated by the design and the shape of the core-receiving spaces 140 in the phase module 32 assembly as illustratively embodied in FIG. 16 and FIG. 17.

Figure 16:
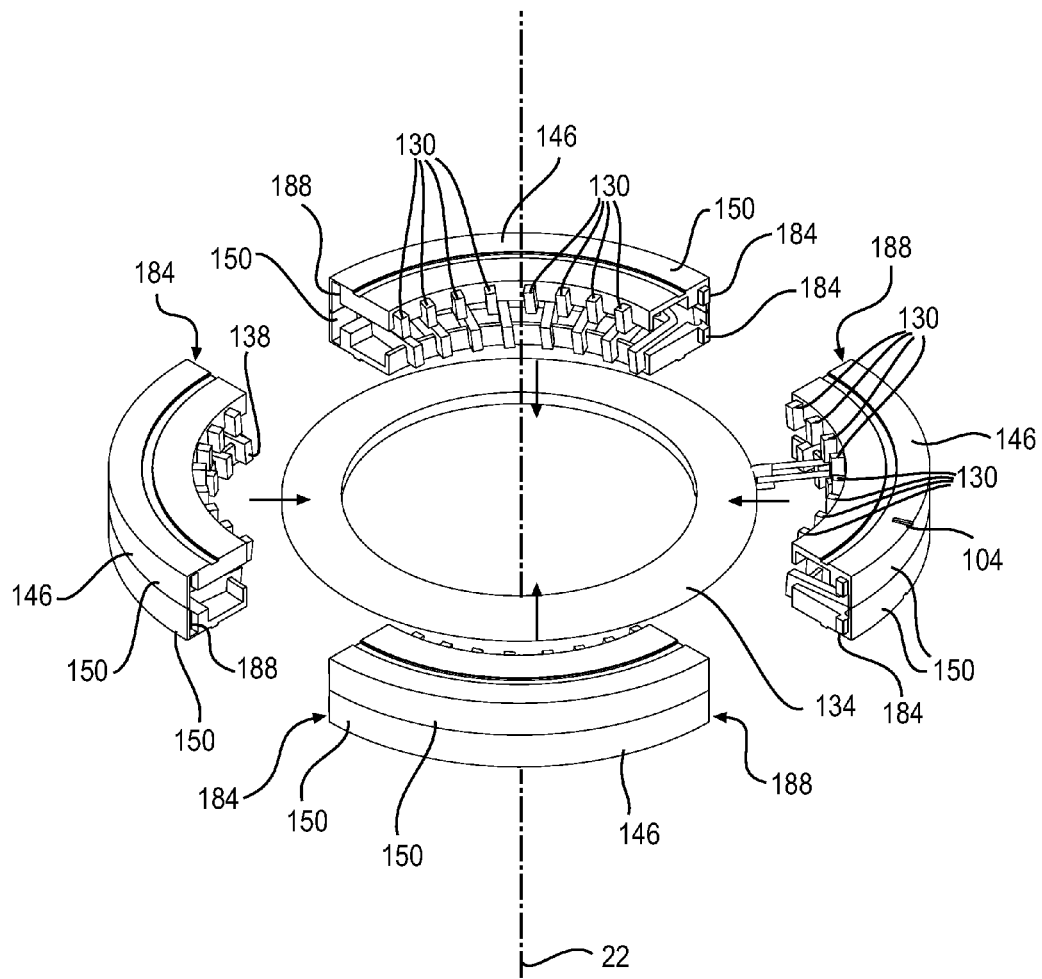
FIG. 16 an isometric semi-exploded view of a phase module of a stator portion in accordance with at least one embodiment of the invention.
Figure 17:
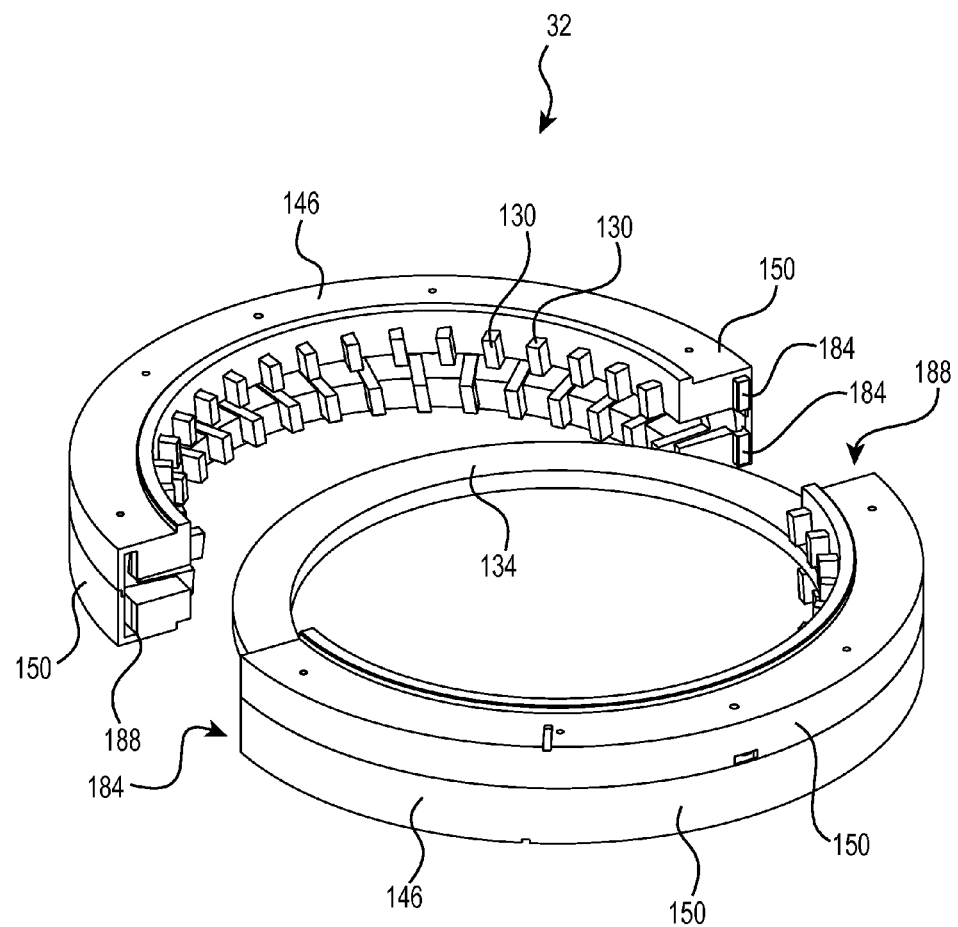
FIG. 17 an isometric semi-exploded view of a phase module of a stator portion in accordance with at least one embodiment of the invention.
Figure 18:
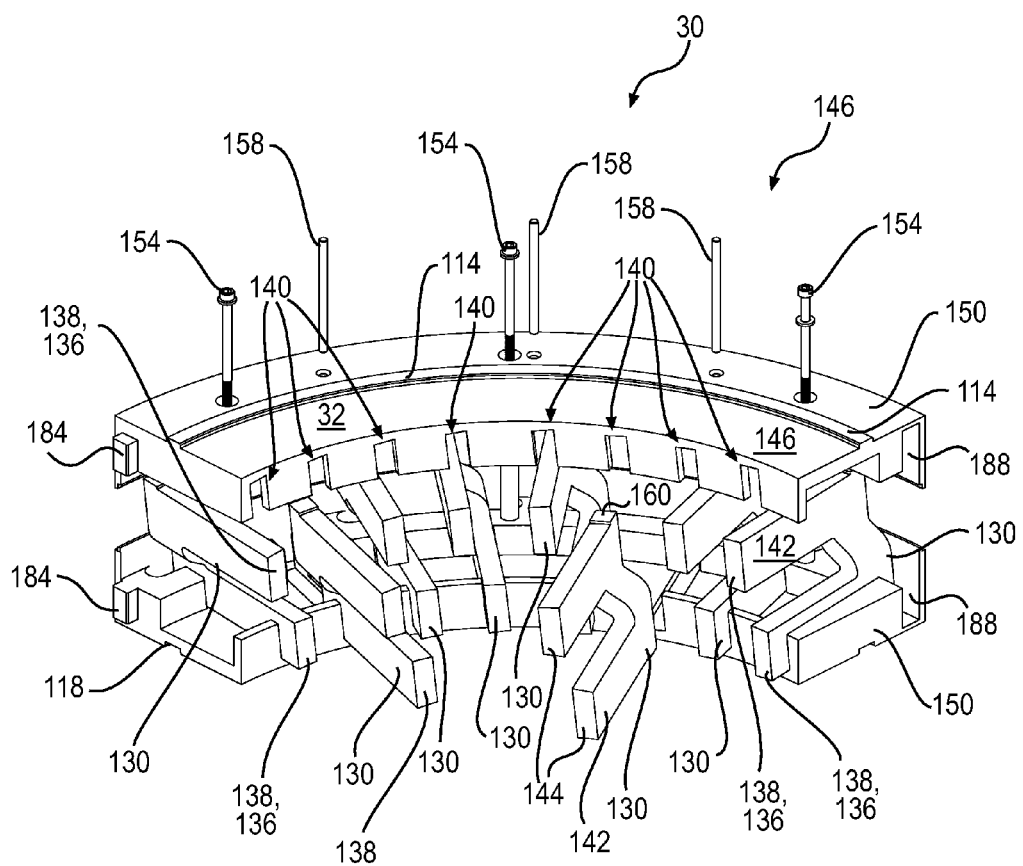
FIG. 18 an isometric partial assembly of a phase module in accordance with at least one embodiment of the invention.

In the present embodiment, as shown in FIG. 16, each stator phase module 33 is built with a sufficiently mechanically resistant material machined to form proper shapes therein and includes four angular portions 146 (for instance, four angular portions 146 of 90° [mechanical] each=360° [mechanical] once assembled together for a complete stator phase module 32) that are assembled together to locate and secure the cores 130 and the coil 134 within the phase module 32. The embodiment illustrated in FIG. 16 uses four (4) angular portions 146 and could alternatively use a different number of angular portions 146 as long as they complete 360° [mechanical] without departing from the scope of the present application; an embodiment including a modular phase 32 with two angular portions 146 is illustrated in FIG. 17. A three angular portions 146 embodiment is also contemplated and within the scope of the present invention. The angular portion 146 illustrated in FIG. 18 includes two halves 150 secured together with fasteners 154 and further respectively located with pins 158. The halves 150 are sized and designed to receive therein a predetermined number of cores 130 with a precise stator skew angle α (identified in FIG. 19, inter alia). One can appreciate that the distances between the angular sides of the angular portion 146 and their first respective adjacent core 130 is not the same on each halve 150 because of the core 130 skewing. This could have an influence on reference locations of the angles indicated in FIG. 20 and FIG. 21 depending of the reference point used to locate the cores 130.

The phase module 30 can alternatively be constructed with an alternated halves 150 disposition to prevent having halves 150 evenly angularly disposed on each side of the phase module 30. The alternate layout of the halves 150 over the circumference of a complete phase module 30 thus increases the mechanical strength of the phase module 30 because the junction between two adjacent angular portions 146 (on one side of the phase module 30) is going to be mirrored (on the opposite side of the phase module 30) by a continuous portion of the counterpart opposed halve 150. In this embodiment, the fact that the haves 150 are not angularly evenly disposed along the circumference of a phase module 30 on each side thereof, implies that the angular portions 146 are overlapping each other.

Figure 19:
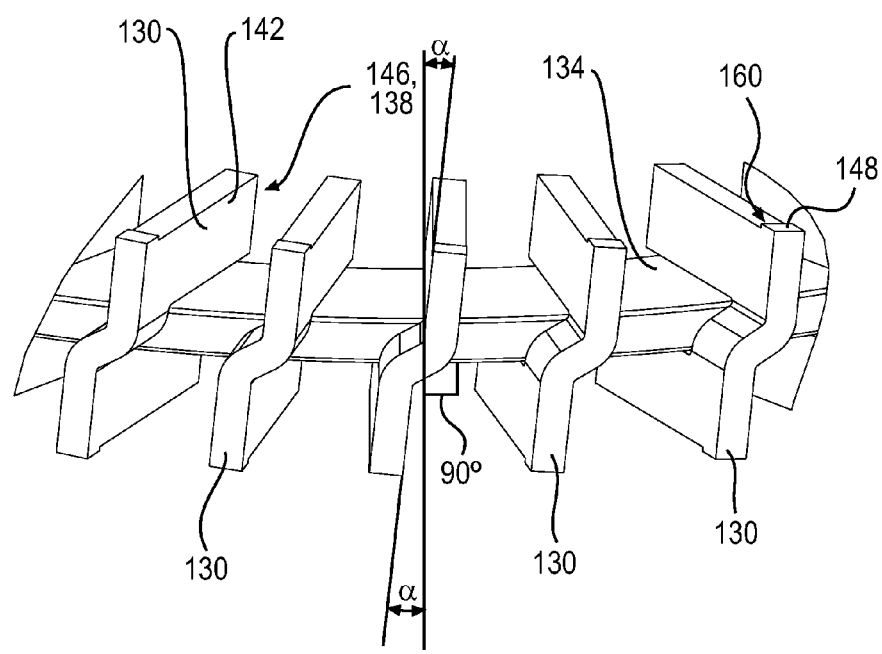
FIG. 19 an isometric partial assembly of cores with a coil in accordance with at least one embodiment of the invention.

FIG. 19 depicts some isolated cores 130 and associated coil 134 sub-assemblies to more clearly illustrate the angle α of the stator skew. The cores 130 and the coil 134 are in the same relative position as if they were within their angular portion 146 (not illustrated), both halves 150 (not illustrated) of the angular portion 146 however, has been removed so that a reader can better appreciate the relative position of the cores 130 and the coil 134 in the assembly. From FIG. 19, the skilled reader can appreciate that the cores 130 are collectively disposed precisely at angle α to provide the desired stator skew and also respectively disposed at predetermined angular distances from each other.

Figure 20:
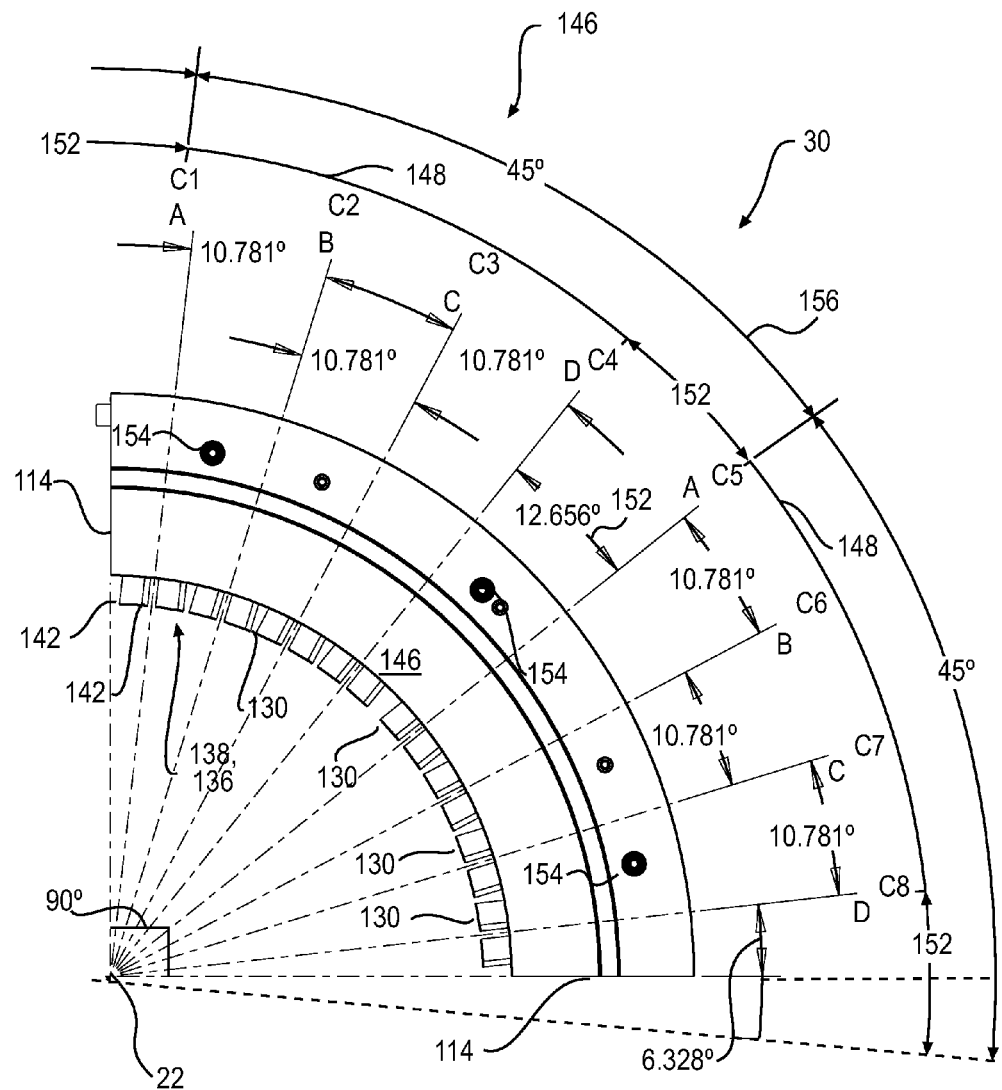
FIG. 20 a front elevational view of a phase module illustrating relative angles thereof in accordance with at least one embodiment of the invention.
Figure 21:
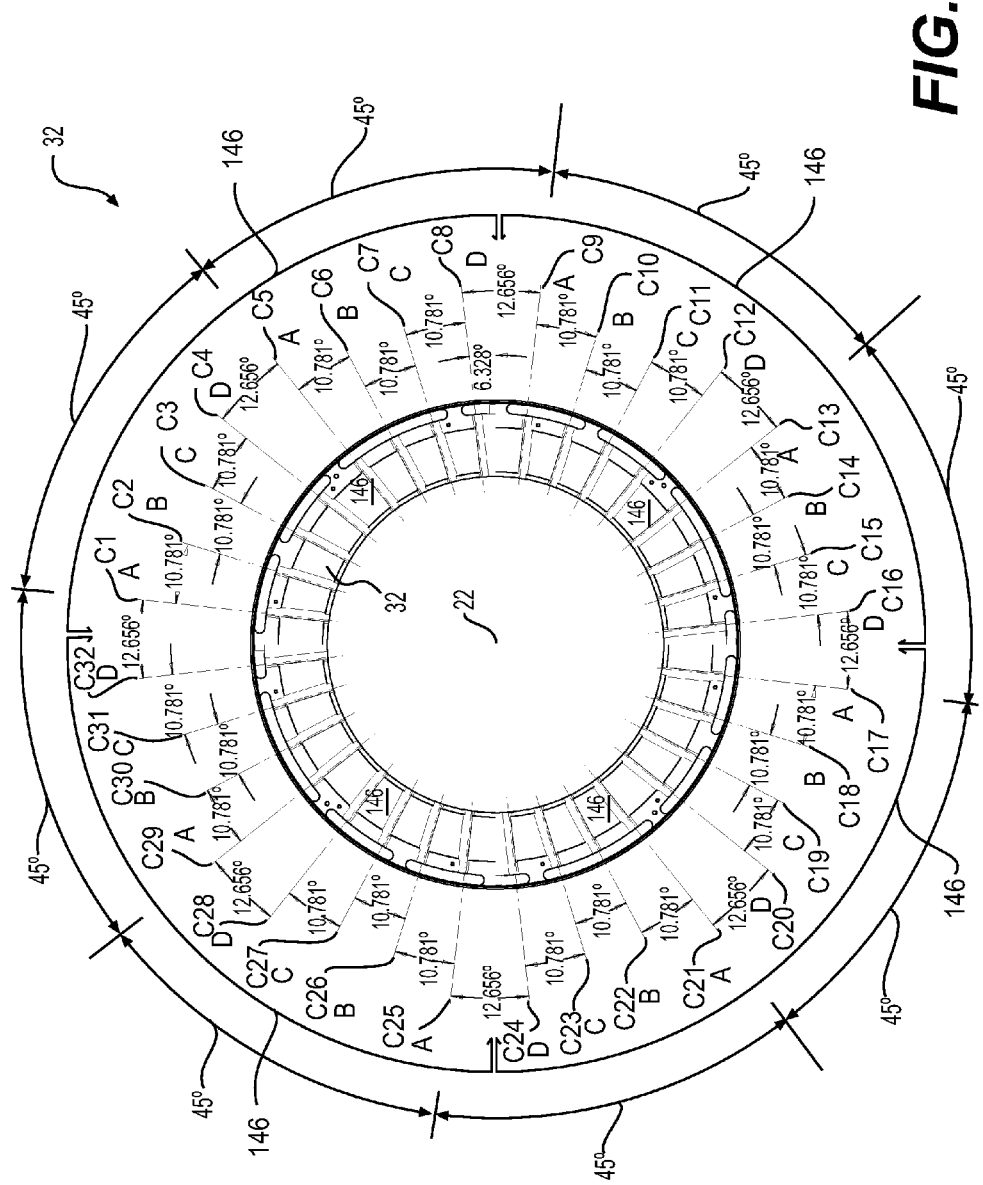
FIG. 21 a front elevational view of a phase module illustrating relative angles thereof in accordance with at least one embodiment of the invention.

Moving now to FIG. 20 and FIG. 21, a skilled reader can appreciate the angles about which are respectively polarly located the cores 130 in a phase module 32. The angles are applied to four (4) angular portions 146 of the embodiment (as indicated above, the illustrated embodiment has four (4) angular portions of 90° each). The relative angles are to be considered between a same reference point on each core 130. More specifically, FIG. 20 depicts an angular portion 146 including eight (8) cores 130 respectively identified C1-C8. In this embodiment, cores C1-C4 form a set 148 of poles 136 where the intervening angles (10.781° [mechanical]) between the repeated angular sequences of poles A, B, C, D is constant. The intervening angle (10.781° [mechanical]) could be different and remain constant if the number of cores 130 present in a set 148 of poles 136 is different without departing from the scope of the present application.

A set 148 of poles 136 is repeated with intervening radial angle 152 that has a value adapted to complete an angle of 45° [mechanical] 156 in the present illustrative embodiment. The actual intervening angle 152 of the illustrated embodiment is 12.656° [mechanical] and this angle, required to complete the angle of 45° of the embodiment, could be different should another configuration of set 148 of poles 136 be desirable. In other words, a new set of poles 148 begins each 45° [mechanical] and is repeated a number of times in the present configuration. The number of sets 148 in the illustrative embodiment is eight (8), two per angular portion 146 of 90°. The angle of 45° of the embodiment is 360° [mechanical]/8 and could alternatively be 30°, 60° or 90° and fit in the angular portion 146 of 90° in the illustrated embodiment.

Another unillustrated embodiment of sets 148 includes two (2) cores 130 with a predetermined intervening angular distance (or angle thereof). The set 148 of two cores 130 is separated from the next set 148 of two cores 130 with a different intervening angular distance. This alternate repetitive arrangement of sets 148 is used to build a complete phase module 32. One can appreciate from the illustrated embodiment that the cores 130 are identical and their respective locations dictate the respective locations of their associated poles 136. Other possible embodiment could use cores 130 that are not all identical and the location the poles 136 in the stator module 14 should prevail to ensure proper function of the TFEM.

Figure 22:
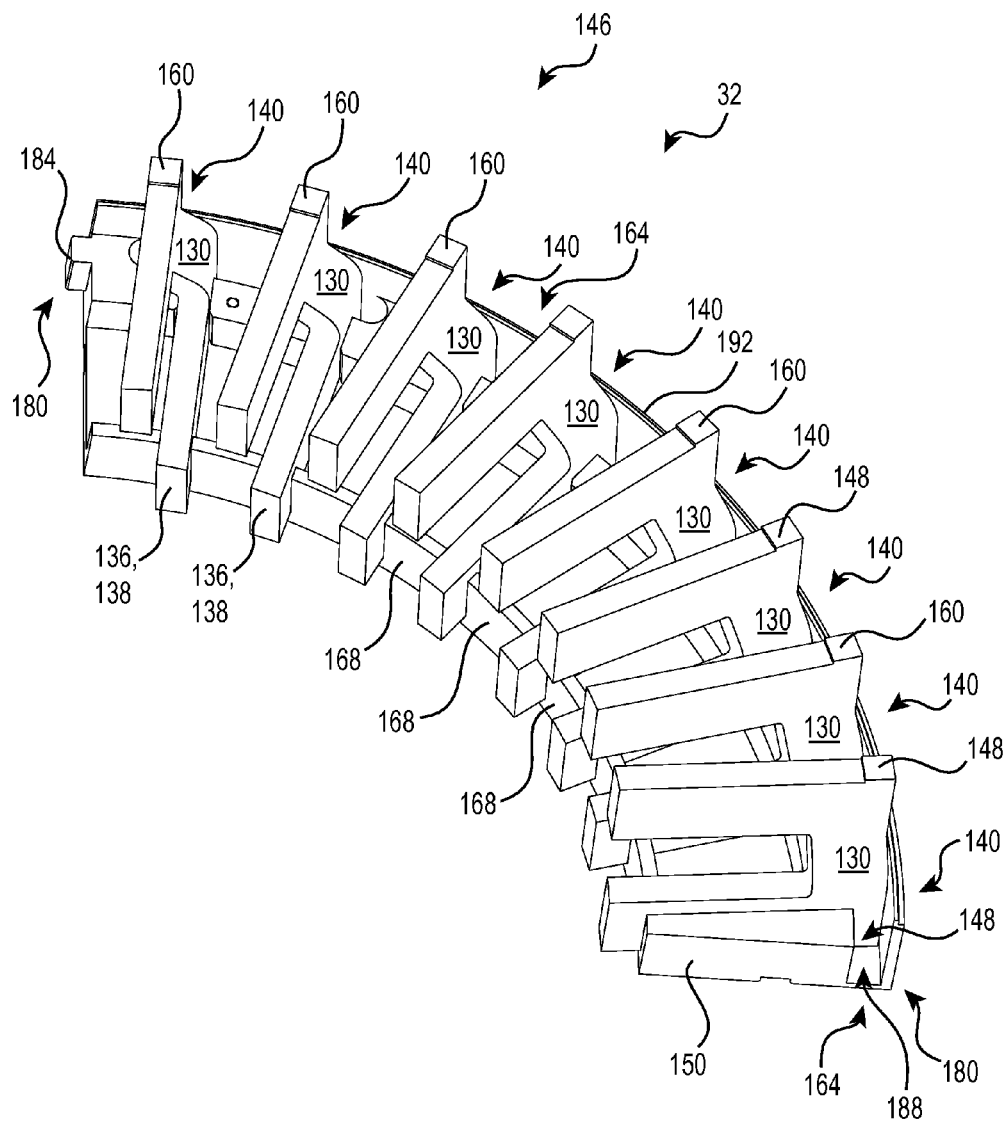
FIG. 22 is an isometric view of a portion of a coil and cores assembly in accordance with at least one embodiment of the invention.
Figure 23:
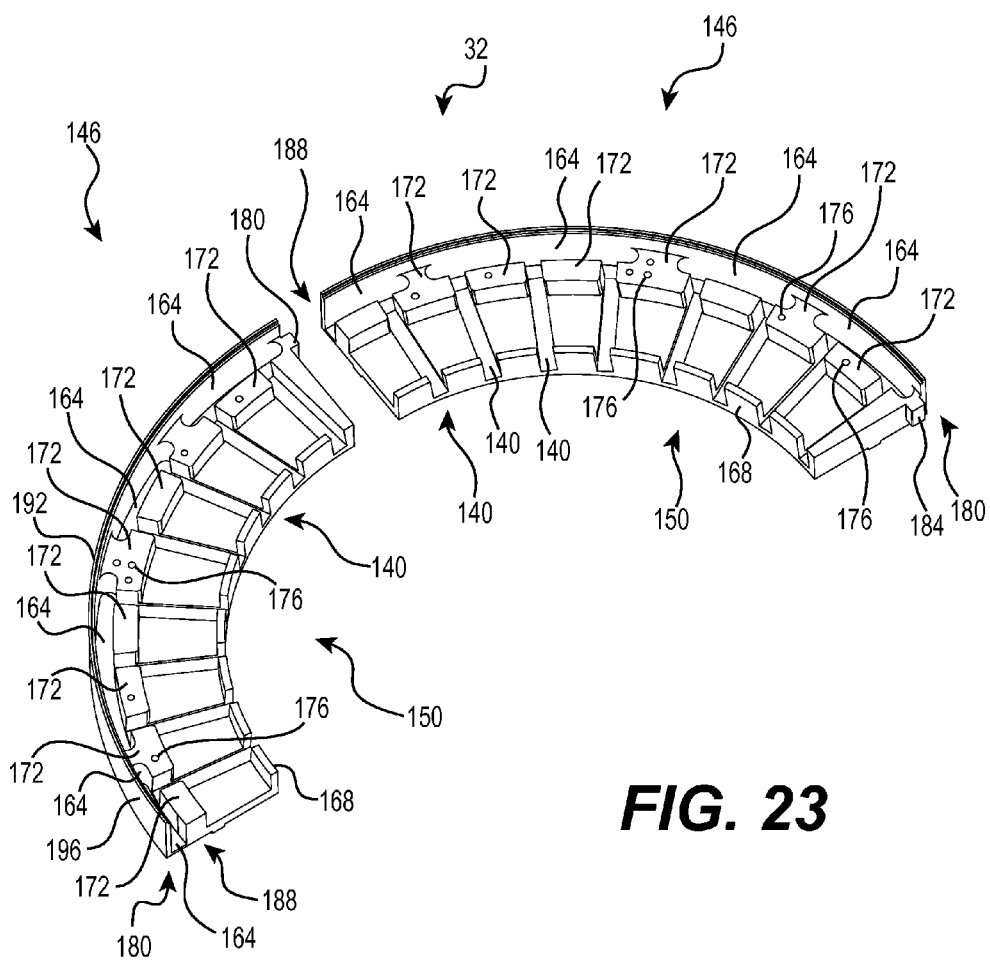
FIG. 23 is isometric view of a portion of a phase module assembly in accordance with at least one embodiment of the invention.
Figure 24:
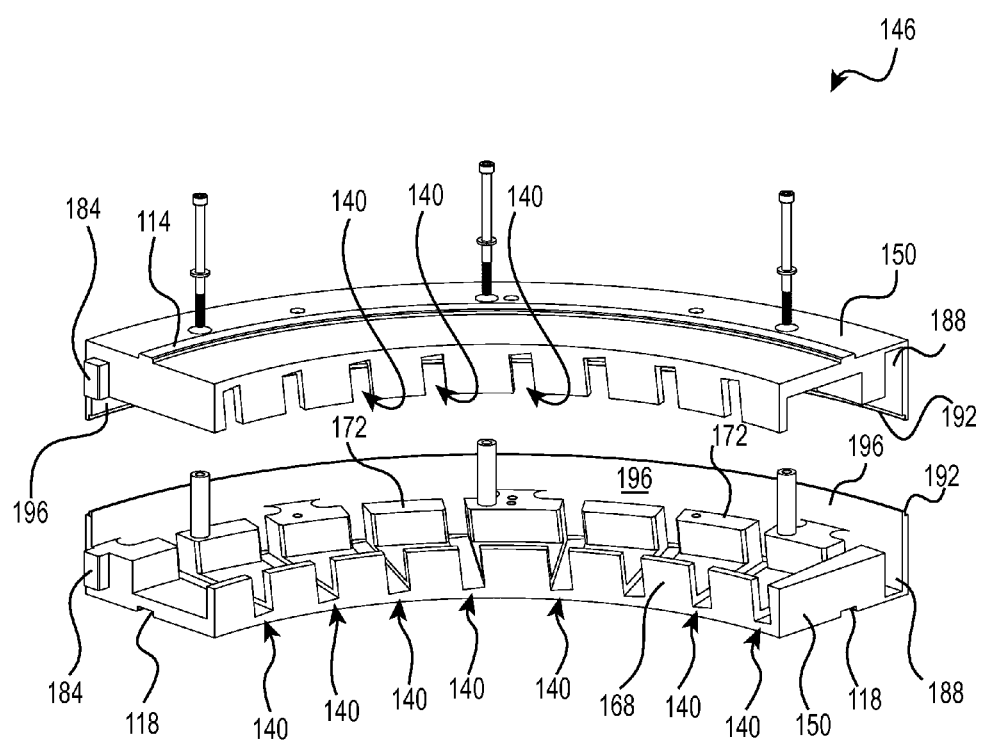
FIG. 24 is isometric view of a portion of a phase module assembly in accordance with at least one embodiment of the invention.

In reference now with FIG. 22 is illustrated an angled portion 146 subassembly where a plurality of cores 130 are inserted in their respective core-receiving space 140 defined in one halve 150. Each core-receiving space 140 is machined or shaped in the halve 150 at a precise angular position to properly locate each core 130 thereof. The core-receiving space 140 extends to a circumferential cavity 164 sized and designed to receive therein the locating portion 148 of each core 130. The circumferential cavity 164 is axially deeper than the depth of the core-receiving space 140 to define an edge adapted to abut the locating portion 148, and appended edge 166, and therefore radially locates the core 130 in the phase module 32. The circumferential cavity 164 can be continuous around each halves 150 or be discontinuous as illustrated in FIG. 22 and FIG. 23. A discontinuous circumferential cavity 164 allows for less material removal and increased mechanical strength of the phase module 32. A protrusion 168 is radially proximally located between core-receiving spaces 140 to further support the cores 130 and to create a proximal wall portion when two cooperating halves 150 are assembled together to form an angular portion as it is illustrated in FIG. 24. Similarly, a radial edge 192, circumvently defined in a distal wall portion 196, further axially locates the two assembled halves 150 and creates an external wall of the phase module 32. Thus, two assembled halves 150 create a solid housing surrounding self-localized cores 130 secured therein. Each halve 150 is further provided with internal pillar members 172 adapted to mirror with corresponding internal pillar members 172 of the other cooperating halve 150 and prevent, inter alia, deformation of the halves 150 when they are secured together with fasteners through openings 176 disposed in some of the pillar members 172. A skilled reader can understand that the core-receiving spaces 140 of two cooperating halves 150 are not mirroring each other because they are intended to receive therein cores 130 that have poles offset 132 and also because of the angle α of the stator skew, as described above.

Still referring to FIG. 22, FIG. 23 and FIG. 24, each halve 150 includes a unification mechanism 180 adapted to unite and locate two adjacent angular portions 146. The unification mechanism 180 illustrated in the embodiments includes a male portion 184 and a corresponding female portion 188. The male portion 184 is sized and designed to match the female portion 188 and ensures proper mechanical connection between the angular portions 146.

Figure 25:
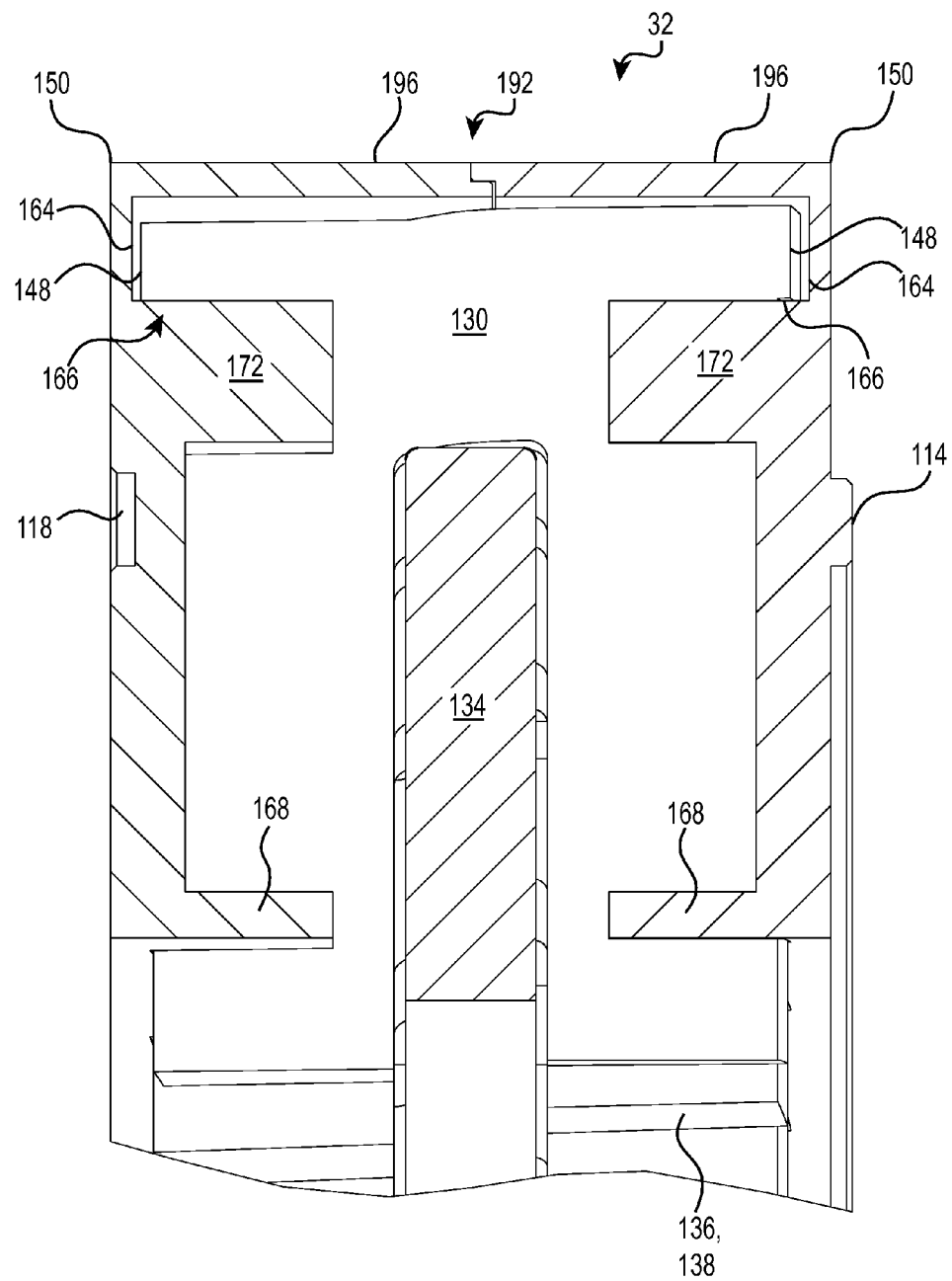
FIG. 25 is a section view of a core module in accordance with at least one embodiment of the invention.

FIG. 25 depicts a section view of a phase module 32 with two assembled halves 150. It is possible to appreciate the position of the core 130 enclosed in the phase module 32, however, the circular phase module 32 and the skewed core 130 render a little non-obvious the interpretation of FIG. 25.

Figure 26:
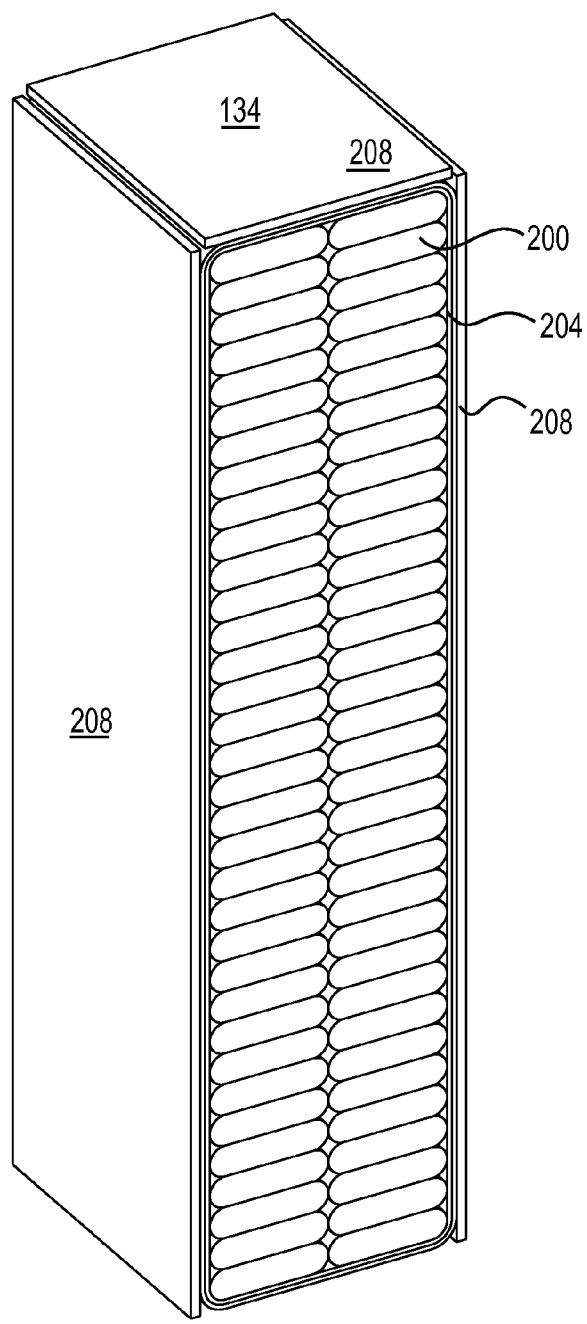
FIG. 26 is a section view of a coil in accordance with at least one embodiment of the invention.
Figure 27:
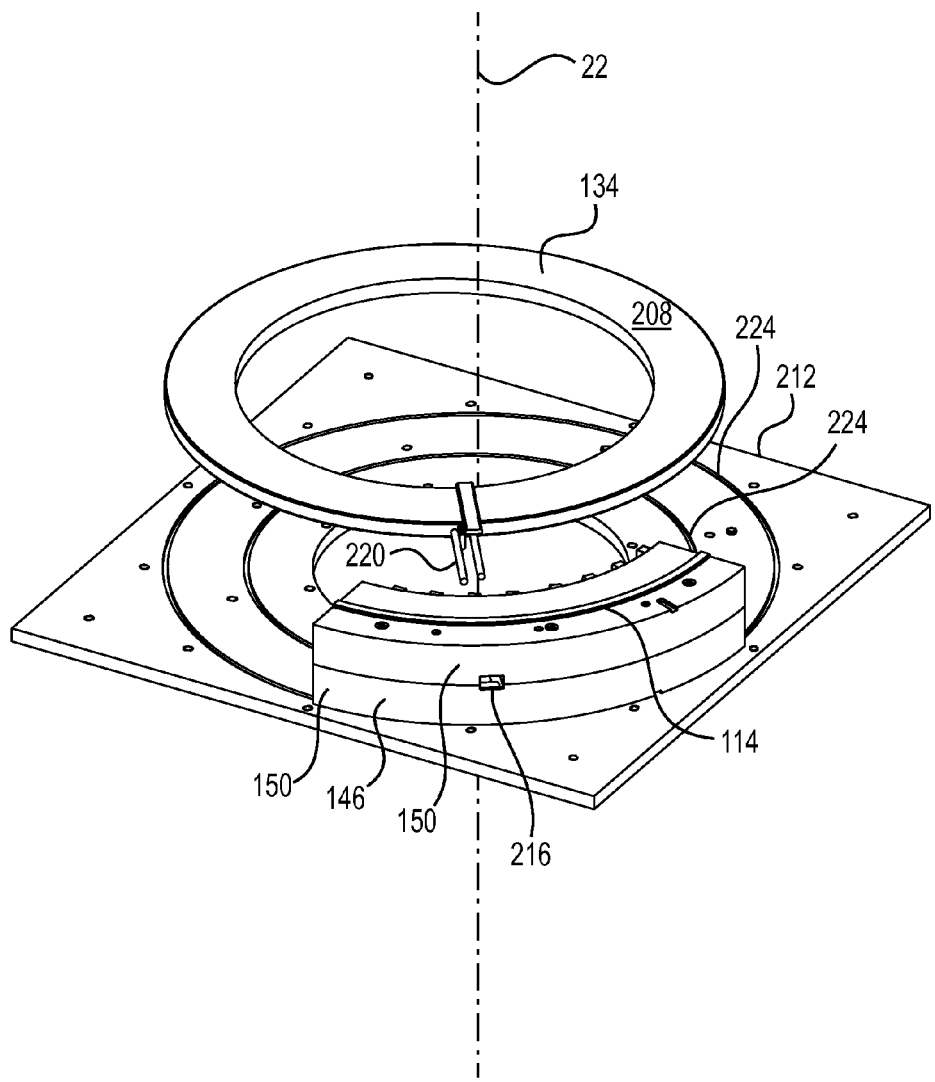
FIG. 27 is an isometric view of a phase module assembly in accordance with at least one embodiment of the invention.

FIG. 26 represents a section view of an isolated coil 134 including a plurality of conductive wire 200 windings covered with a layer of insulating resin 204. It can be noted the illustrated embodiment includes a plurality of conductive wire 200 windings although other unillustrated embodiments can use a single or multiple conductive wires to form the coil 134. The conductive wire 200 illustrated in the embodiment has a rectangular, or oblong, section to maximize the conductive wire 200 density in the coil 134 (less empty space). An additional insulating layer 208, made of fabric in the embodied illustration, is added over the coil 134 to protect the conductive wires 200 and the insulating resin 204 to be damaged by mechanical contacts with the halves 150 during installation.

Figure 28:
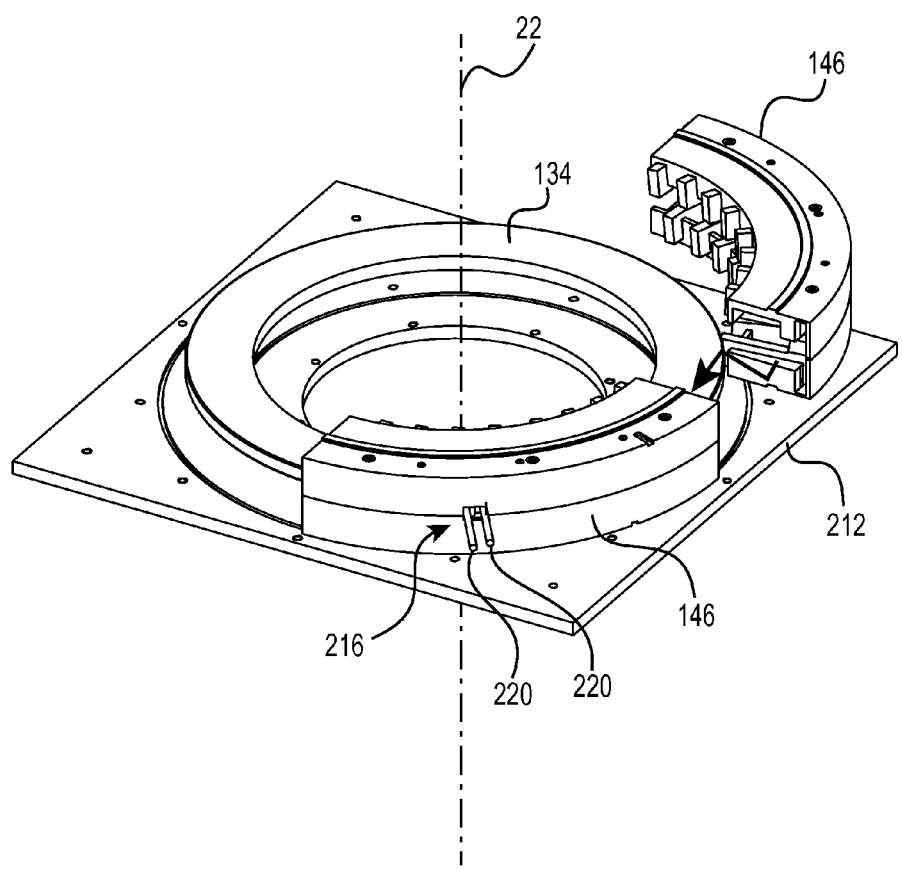
FIG. 28 is an isometric view of a phase module assembly in accordance with at least one embodiment of the invention.
Figure 29:
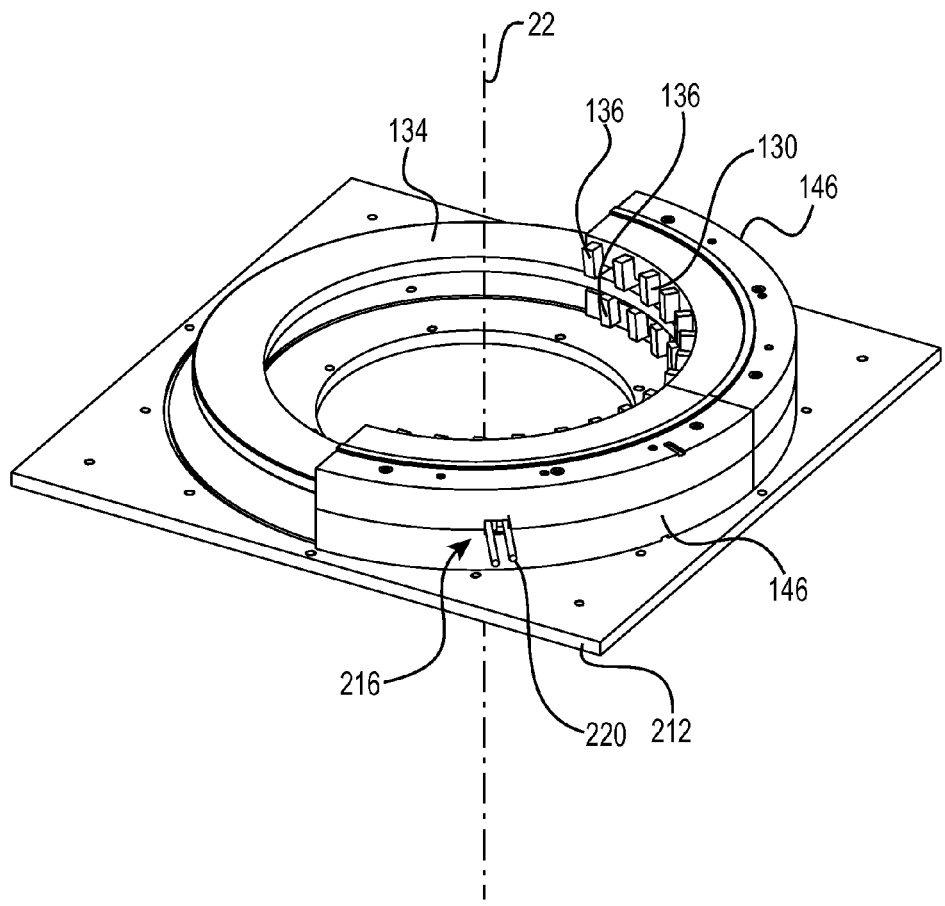
FIG. 29 is an isometric view of a phase module assembly in accordance with at least one embodiment of the invention.
Figure 30:
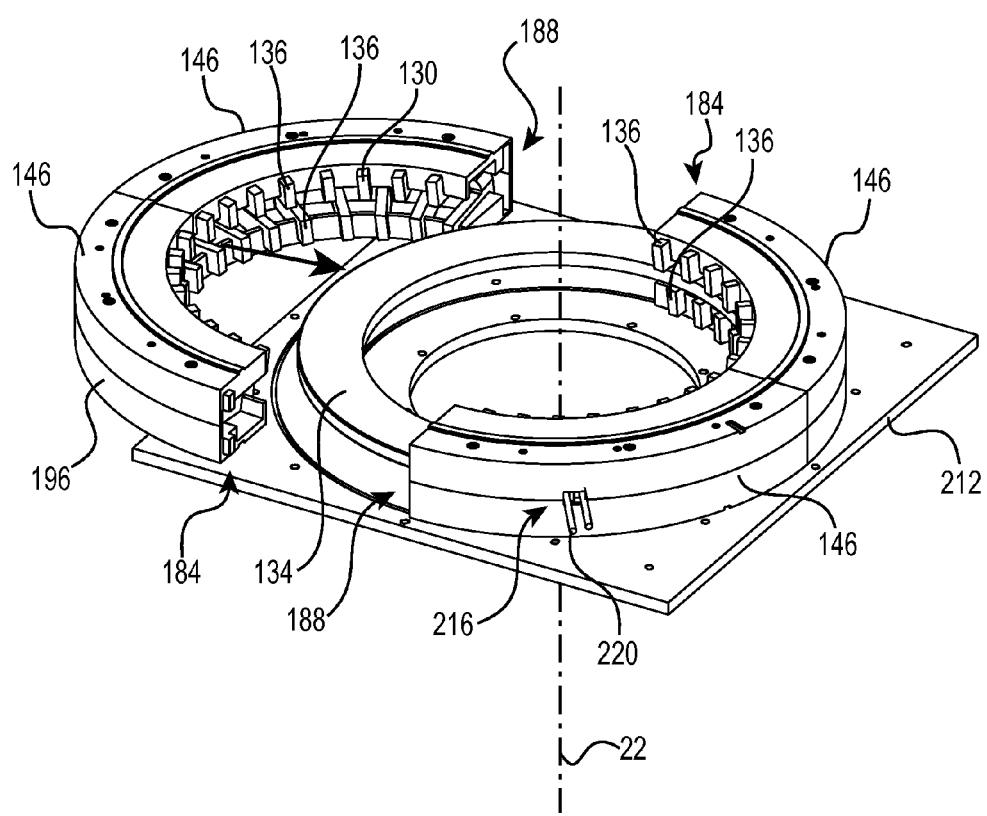
FIG. 30 is an isometric view of a phase module assembly in accordance with at least one embodiment of the invention.
Figure 31:
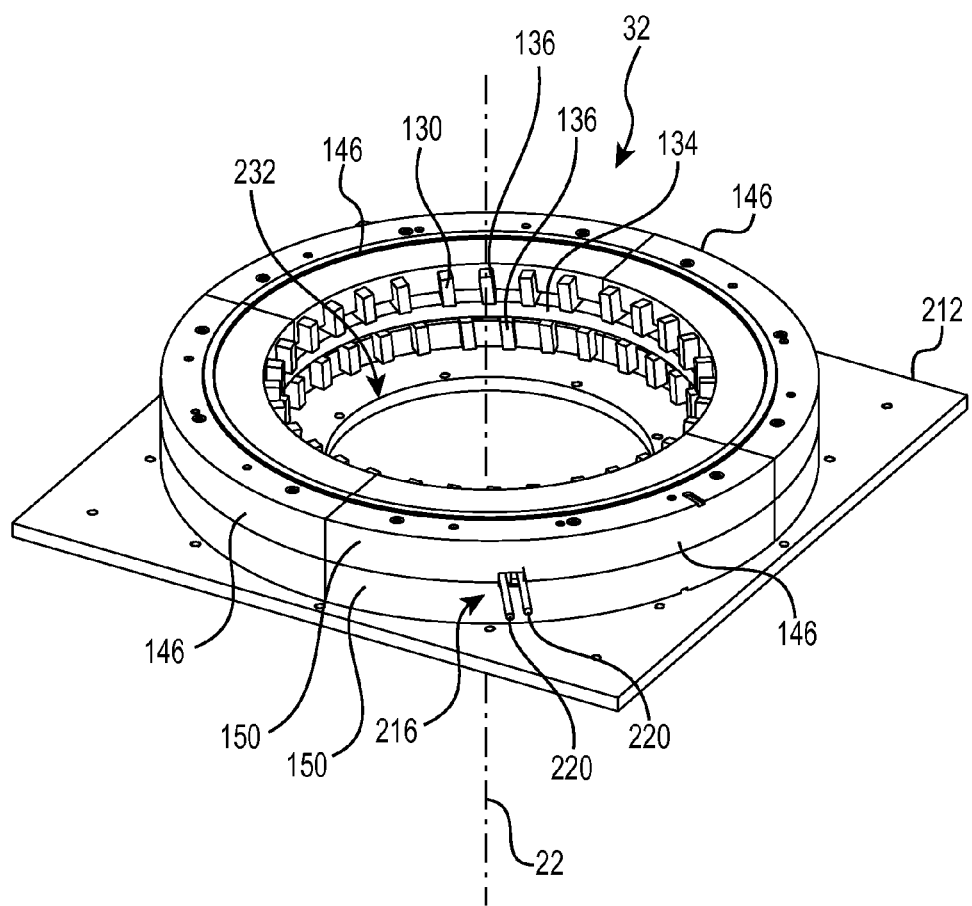
FIG. 31 is an isometric view of a phase module assembly in accordance with at least one embodiment of the invention.

Moving now to the angular portions 146 assembly illustrated in FIG. 27 through FIG. 31. A first assembled angular portion 146 is secured to a first jig plate 212. The angular portion 146 is located with locating rings 224 disposed on the jig plate 212 to mechanically position the angular portions 146 thereof. The coil 134 is introduced between the legs 142 of the cores 130 disposed in the angular portion 146 once the first angular portion 146 is installed on the first jig plate 212. The first angular portion 146 to be installed on the jig plate 212 is preferably the angular portion 146 including a wire opening 216 adapted to pass through the connecting wires 220 extending from the coil 134. It might be more difficult to assemble the angular portions 146 if one does not begin the assembly with the angular portion 146 including the wire opening 216. A second angular portion 146 is assembled as illustrated in FIG. 28 and FIG. 29 adjacent to the angular portion 146 already installed on the jig plate 212. A third and a fourth angular portions 146 are simultaneously assembled to complete the angular portions 146 assembly as it can be appreciated in FIG. 30. The final angular portion 146 assembly is preferably made with a 180° angular portion 146 sub-assembly to ensure the male portions 184 and the female portions 188 of the angular portions 146 are easily engaging. FIG. 31 illustrates four (4) angular portions 146 assembled together and supported by the jig plate 212 in accordance with an illustrative embodiment of the invention. Another possible unillustrated embodiment encompassed by the present invention includes only two halves 150 to build a phase module 32, one on each side of a phase module 32, each halve 150 radially covering 360° of the phase module 32, about the rotation axis 22, to enclose the cores 130 and the coil 134 therein.

Figure 32:
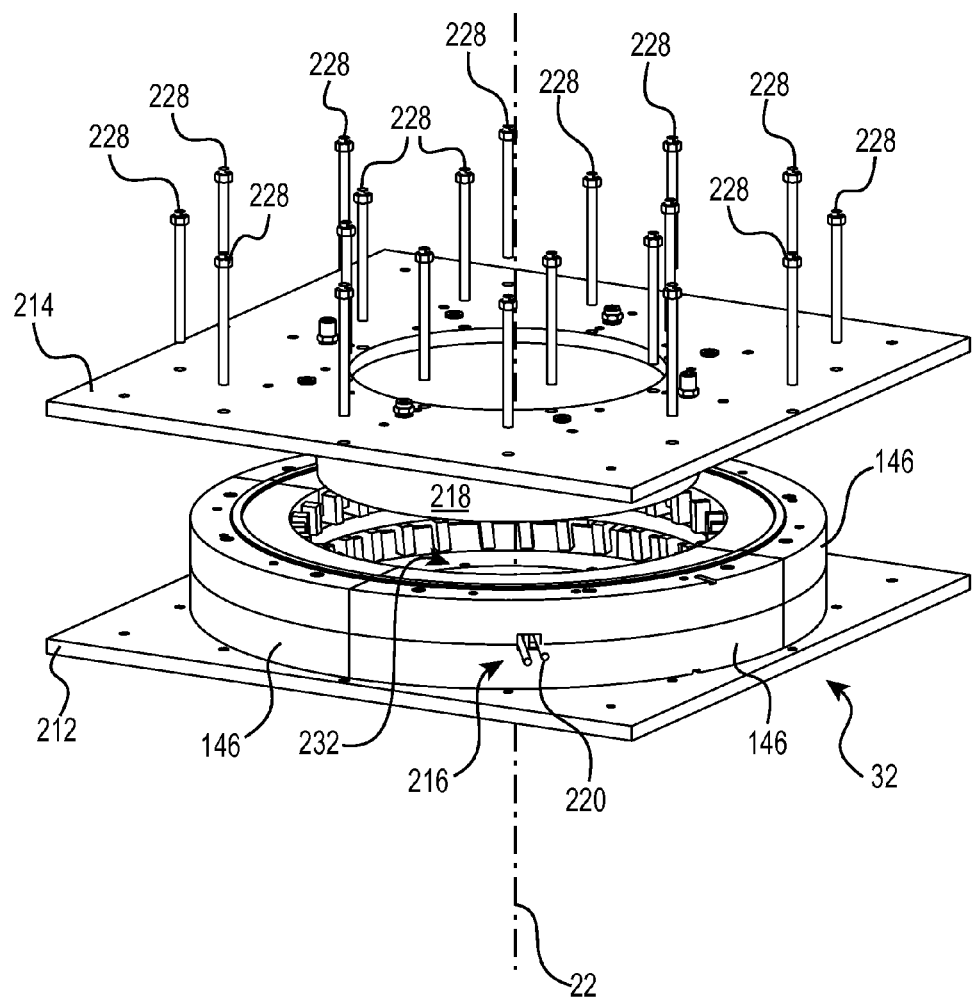
FIG. 32 is an isometric view of a phase module and jig assembly in accordance with at least one embodiment of the invention.
Figure 33:
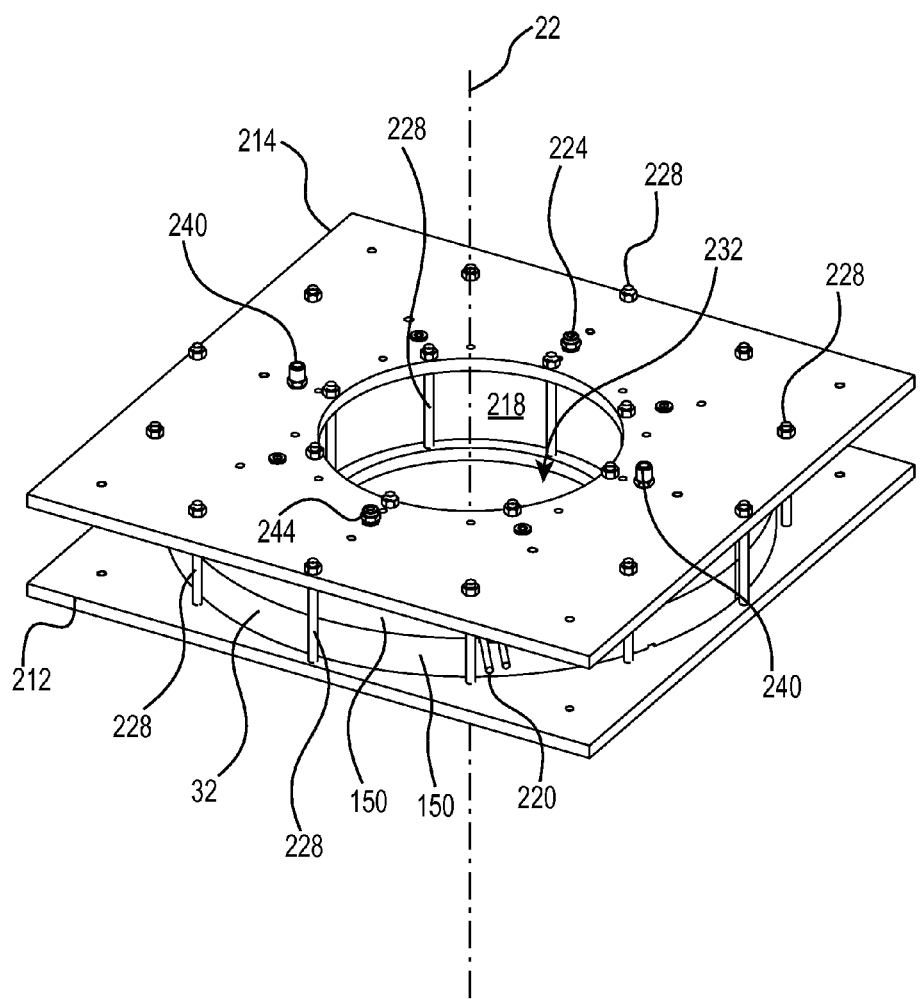
FIG. 33 is an isometric view of a phase module and jig assembly ready for resin injection in accordance with at least one embodiment of the invention.

A second jig plate 214 is added to the assembled angled portions 146 to secure the phase module 32 between the two jig plates 214 as illustrated in FIG. 32. A series of fasteners are engaged through the jig plates 212 and angled portions 146 assembly and secured to the jig plates 212, 214 and the phase module 32 together in a tight manner—a seal can be used—preventing leakage between the jig plates 212 and the phase module 32. The second jig plate portion 214 includes a central wall portion 218 sized and designed to seal the central portion 232 of the phase module 32 between the two jig plates 212—here again a seal can be used. The assembled jig portions 212, 214 and the sealed intervening phase module 32 hence becomes an injection mold in which is injected a resin, or a polymer, adapted to cure and secure all the cores 130 and the coil 134 in the halves 150 of the phase module 32.

Resin or polymer is used to interconnect the parts contained in each phase module 32. Each phase module 32 is injected separately in the illustrative embodiment however one skilled in the art could understand it is possible to collectively inject all the assembled phase module 32 together with a properly designed assembly process and a jig sized and designed accordingly. The resin 248, preferably, has to meet two main criteria: 1) sufficient mechanical strength, 2) sufficient thermic conductivity and 3) electrical resistivity. These three requirements ensure all parts of a phase module 32 are adequately maintained together at their respective locations. The injected resin 248 is also a means of filling the gaps and spaces left between the assembled parts to prevent any remaining play due to the tolerances required for manufacturing all the parts and secure all the parts of the assembly together in their operating positions. Sufficient mechanic strength is required to sustain compression mainly due to the torque generated by the operating parts and transferred to the axial members 26 of the TFEM 10. The selected resin 248 should also be a good vibration damper to protect the cores 130, the coil 134 and their respective halves 32 and prevent any undesirable contact between the operating parts of the TFEM 10. Thermal conductivity is another desirable role of the resin 248 that replaces air (empty volumes) in the phase module 32 to cool the internal parts of the TFEM 10 by transferring thermic energy to the environment of the TFEM 10. The resin 248 should also be tolerant to temperature variations that can reach between −40° C. and 180° C. with minimal changes in its mechanical properties. The resin prevents conducting magnetic flux within the internal parts of the phase module 32 that would prevent proper flux transfer with the cores 130 around the coil 134. The resin should also prevent creating Foucault current within the internal parts of the phase module 32 and therefore prevent additional energy loss. Finally, the resin 248 should be adapted to be machined to set the final dimensions of the interior of the stator portion 14 to receive therein the rotor portion 18 with minimal airgap 126 therebetween. Epoxy resin is an example of a resin 248 suitable to be used in the present TFEM 10 among other possible choices of resin 248 or other materials adapted to meet the requirements listed above.

The second jig module 214 is provided with injection inlets 240, to inject resin or polymer in the mold, and injection outlets 244 to purge, or vacuum, air from the mold during the injection process. The same process is used with each of the phase module 32 to get, in the context of the present embodiment that is a three-phased alternator, three injected phase modules 32. Other configurations, other types of mold assembly and mold inlets/outlets can be used without departing from the scope of the exemplified invention.

Figure 34:
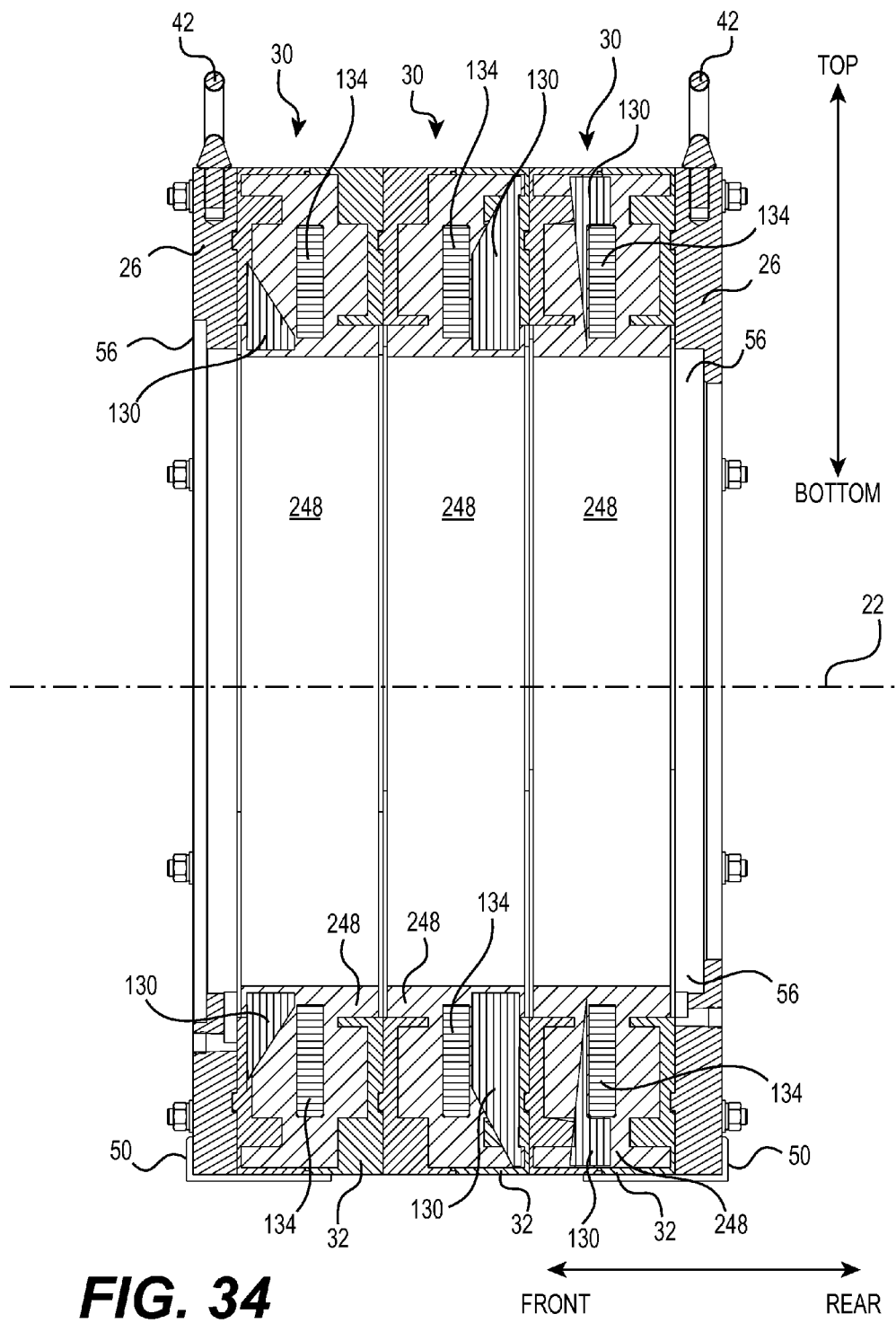
FIG. 34 is a side elevational view of a resin-injected stator module before being machined and/or honed in accordance with at least one embodiment of the invention.

Three injected phase modules 32 are assembled together as explained above and the result is shown in FIG. 34. The resin injected in the phase module 32 secures the coil 134, the cores 130 in the angular portions 146 in addition to secure the angular portions 146 and their respective halves 150 together. The resin thus injected transforms the phase module 34 assembly in a unitary and integral phase module 32. FIG. 34 should be viewed in light of FIG. 14 and from it one can appreciate that the poles 138 of the cores 130 are not shown in FIG. 34. This is because the resin injected in the phase module 32 covers the cores 130 and a further step is required to carefully remove a layer of resin inside the assembled core modules 32. The three (3) assembled phase modules 32 are preferably bored, and optionally honed, once assembled together to remove excess resin and shortens the length of the core's legs 142 to a desired diameter to ensure tight tolerances can be obtained for the diameter and the concentricity of the multiple core modules 32 assembly in order to minimize the airgap 126 when the rotor portion 18 is assembled with the stator portion 14. A small airgap increases the magnetic field strength between the stator portion 14 and the rotor portion 18. One can appreciate that machining all the separate part individually and assembling them thereafter is going to cause an addition of the tolerances that is likely going to increase the final airgap 126 to prevent possible (statistically possible) mechanical interferences. Alternatively, each phase module 32 can individually be bored and honed individually prior to be assembled with adjacent phase modules 32. The final result, when stator boring is done, is illustrated in FIG. 14.

Figure 35:
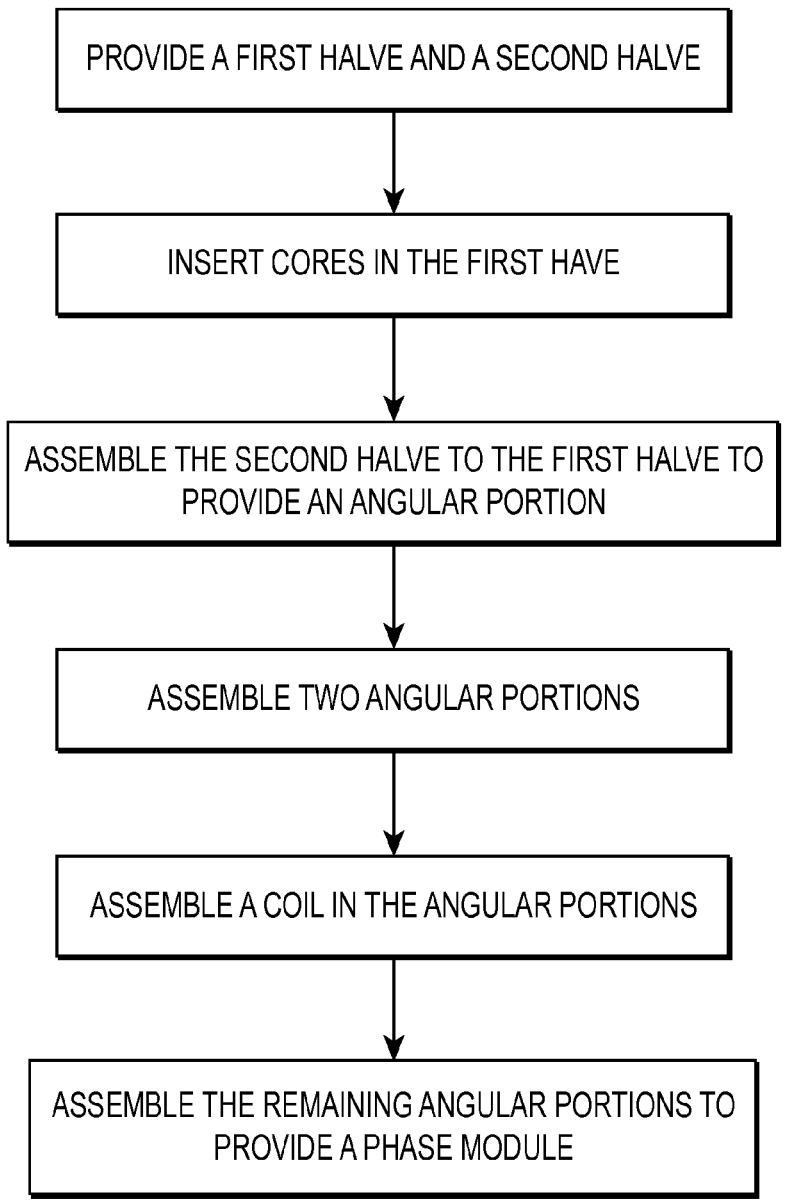
FIG. 35 is flow chart representative of assembly steps in accordance with at least one embodiment of the invention.
Figure 36:
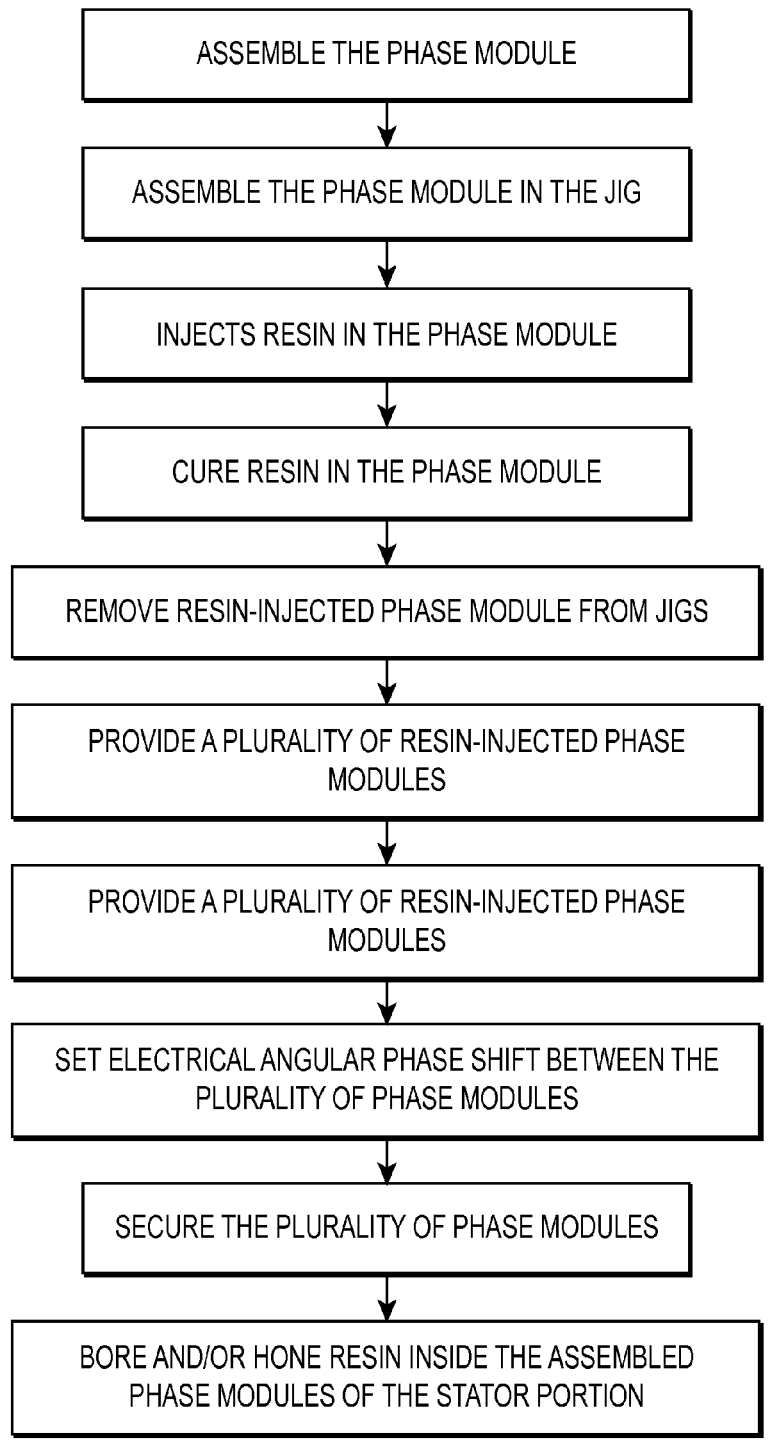
FIG. 36 is flow chart representative of resin injection steps in accordance with at least one embodiment of the invention.

FIG. 35 generally illustrates a series of steps adapted to assemble to stator portion in accordance with an embodiment of the invention. FIG. 36 illustrates illustrative steps for securing the parts of the stator portion together in accordance with at least one embodiment of the invention.

The description and the drawings that are presented above are meant to be illustrative of the present invention. They are not meant to be limiting of the scope of the present invention. Modifications to the embodiments described may be made without departing from the present invention, the scope of which is defined by the following claims.

What is claimed is:
1. A rotatable transverse flux electrical machine (TFEM) comprising:
a modular stator including a plurality of axially assembled phase modules, each phase module comprising
a pair of opposed halves including a plurality of core-receiving spaces radially extending through the halves toward an axial center of the halves, each halve including a half portion of a core-receiving space, the half portion of a core-receiving space in a first halve being angularly offset with corresponding half portion of the core-receiving space in a second halve when both opposed halves are assembled together;
a plurality of cores secured between the pair of opposed halves inside respective phase modules, each of the cores being U-shaped with a pair of legs thereof, the pair of legs being angularly offset in the pair of opposed halves;
a coil operatively disposed between the pair of legs of the cores inside each phase modules, wherein the pairs of legs of the cores are radially and proximally extending through the pair of opposed halves; and
resin securing the plurality of cores and the coil between the pair of halves,
and, the TFEM further comprising
a rotor rotatably axially located in relation with the modular stator portion.

2. The rotatable transverse flux electrical machine (TFEM) of claim 1, wherein the plurality of phase modules is substantially identical.

3. The rotatable transverse flux electrical machine (TFEM) of claim 1, further comprising a cooperating positioning mechanism adapted to angularly locate adjacent phase modules axially assembled together.

4. The rotatable transverse flux electrical machine (TFEM) of claim 1, wherein the plurality of phase modules is two phase modules axially assembled together with an intervening phase shift generally set at 90° [electrical] between adjacent phase modules to provide a two-phase symmetrical electric current overlapping over a complete 360° electrical cycle.

5. The rotatable transverse flux electrical machine (TFEM) of claim 1, wherein the plurality of phase modules is three phase modules axially assembled together with an intervening phase shift generally set about 120° [electrical] between adjacent phase modules to provide a three-phase symmetrical electric current overlapping over a complete 360° electrical cycle.

6. The rotatable transverse flux electrical machine (TFEM) of claim 1, wherein the plurality of phase modules is axially secured together by opposed support portions.

7. The rotatable transverse flux electrical machine (TFEM) of claim 1, wherein the phase modules are axially secured together with a plurality of axially securing members.

8. A modular stator adapted to be used in a rotatable transverse flux electrical machine (TFEM), the modular stator comprising:
a plurality of axially assembled self-containing phase modules, each phase module comprising
a pair of opposed halves including a plurality of core-receiving spaces radially extending through the halves toward an axial center of the halves, each halve including a half portion of a core-receiving space, the half portion of a core-receiving space in a first halve being angularly offset with corresponding half portion of the core-receiving space in a second halve when both opposed halves are assembled together;
a plurality of cores secured between the pair of opposed halves inside respective phase modules, each of the cores being U-shaped with a pair of legs thereof, the pair of legs being angularly offset in the pair of opposed halves;
a coil operatively disposed between the pair of legs of the cores inside each phase modules, wherein the pairs of legs of the cores are radially and proximally extending through the pair of opposed halves; and
resin securing the plurality of cores and the coil between the pair of halves and wherein the modular stator is configured to operatively receive therein a rotor axially located in relation with the modular stator portion.

9. The modular stator of claim 8, wherein the plurality of phase modules is substantially identical.

10. The modular stator of claim 8, further comprising a cooperating positioning mechanism adapted to angularly locate adjacent phase modules axially assembled together.

11. The modular stator of claim 8, wherein the plurality of phase modules is two phase modules axially assembled together with an intervening phase shift generally set at 90° [electrical] between adjacent phase modules to provide a two-phase symmetrical electric current overlapping over a complete 360° electrical cycle.

12. The modular stator of claim 8, wherein the plurality of phase modules is three phase modules axially assembled together with an intervening phase shift generally set about 120° [electrical] between adjacent phase modules to provide a three-phase symmetrical electric current overlapping over a complete 360° electrical cycle.

13. The modular stator of claim 8, wherein the plurality of phase modules is axially secured together by opposed support portions.

14. The modular stator of claim 8, wherein the phase modules are axially secured together with a plurality of axially securing members.

15. A kit for assembling a modular stator in a rotatable transverse flux electrical machine (TFEM), the kit comprising:
a plurality of phase modules sized and designed to be axially assembled together, each phase module comprising
a pair of opposed halves including a plurality of core receiving-spaces radially extending through the halves toward an axial center of the halves, each halve including a half portion of a core-receiving space, the half portion of a core-receiving space in a first halve being angularly offset with corresponding half portion of the core-receiving space in a second halve when both opposed halves are assembled together;
a plurality of cores operatively disposed between the pair of opposed halves inside each phase module, each of the cores being U-shaped with a pair of legs thereof, the pair of legs being angularly offset in the pair of opposed halves;
a coil operatively disposed between the pair of legs of the cores inside each phase modules, wherein the pairs of legs of the cores are radially and proximally extending through the pair of opposed halves; and
resin securing the plurality of cores and the coil between the pair of halves,
the plurality of phase modules, once assembled, being adapted to receive therein a rotor rotatably and axially located in respect with the assembled phase modules.

16. The kit of claim 15, wherein the plurality of phase modules is substantially identical.

17. The kit of claim 15, further comprising a cooperating positioning mechanism adapted to angularly locate adjacent phase modules axially assembled together.

18. The kit of claim 15, wherein, when the plurality of phase modules is two phase modules, the two phase modules are adapted to be axially assembled together with an intervening phase shift generally set at 90° [electrical] between adjacent phase modules to provide a two-phase symmetrical electric current overlapping over a complete 360° electrical cycle, and, when the plurality of phase modules is three phase modules, the three phase modules are adapted to be axially assembled together with an intervening phase shift generally set about 120° [electrical] between adjacent phase modules to provide a three-phase symmetrical electric current overlapping over a complete 360° electrical cycle.

19. The kit of claim 15, wherein the plurality of phase modules is axially secured together by opposed support portions.

20. The kit of claim 15, wherein the phase modules are axially secured together with a plurality of axially securing members.

* * * * *